United States Patent
D'Acunto et al.

(10) Patent No.: US 11,284,124 B2
(45) Date of Patent: Mar. 22, 2022

(54) SPATIALLY TILED OMNIDIRECTIONAL VIDEO STREAMING

(71) Applicant: Koninklijke KPN N.V., Rotterdam (NL)

(72) Inventors: Lucia D'Acunto, Delft (NL); Emmanuel Thomas, Delft (NL); Mattijs Oskar Van Deventer, Leidschendam (NL); Ray Van Brandenburg, Rotterdam (NL); Arjen Veenhuizen, Utrecht (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 382 days.

(21) Appl. No.: 16/302,500

(22) PCT Filed: May 24, 2017

(86) PCT No.: PCT/EP2017/062517
§ 371 (c)(1),
(2) Date: Nov. 16, 2018

(87) PCT Pub. No.: WO2017/202899
PCT Pub. Date: Nov. 30, 2017

(65) Prior Publication Data
US 2019/0174150 A1  Jun. 6, 2019

(30) Foreign Application Priority Data

May 25, 2016  (EP) .................................. 16001189
May 30, 2016  (EP) .................................. 16172029

(51) Int. Cl.
*H04N 21/218* (2011.01)
*H04N 21/845* (2011.01)
(Continued)

(52) U.S. Cl.
CPC ..... *H04N 21/21805* (2013.01); *H04L 65/608* (2013.01); *H04N 19/167* (2014.11);
(Continued)

(58) Field of Classification Search
None
See application file for complete search history.

(56) References Cited

U.S. PATENT DOCUMENTS 10,360,721 B2  7/2019  Lai
10,805,614 B2  10/2020  D'Acunto et al.
(Continued)

FOREIGN PATENT DOCUMENTS

CN  1707354 A  12/2005
CN  101146231 A  3/2008
(Continued)

OTHER PUBLICATIONS

Champel, M.L., "SRD Extensions for VR," ISO/IEC JTC1/SC29/WG11 MPEG 114/m38689, Geneva, Switzerland, May 2016.
(Continued)

*Primary Examiner* — Justin E Shepard
(74) *Attorney, Agent, or Firm* — Hamilton, Brook, Smith & Reynolds, P.C.

(57) ABSTRACT

A method is described for processing an omnidirectional video by a client device, said omnidirectional video being associated with a 3D coordinate system for determining a spatial position of video data of said omnidirectional video on a curved surface, preferably a sphere, said method comprising: receiving a manifest file, the manifest file comprising a plurality of tile stream identifiers for identifying a plurality of tile streams, the tile streams comprising video frames having image views, whereby the image views of video frames of different tile streams cover different regions of a 2D projection of the omnidirectional video, a
(Continued)

region defining a tile; selecting on the basis of spatial relation information in the manifest file and on the basis of a viewpoint of a user of the client device a first tile streams associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, tile position and the viewpoint being defined on the basis of coordinates of the 3D coordinate system.

17 Claims, 13 Drawing Sheets

(51) Int. Cl.
  *H04N 21/43* (2011.01)
  *H04N 21/2343* (2011.01)
  *H04N 21/262* (2011.01)
  *H04N 19/167* (2014.01)
  *H04L 65/65* (2022.01)
  *H04N 21/6587* (2011.01)

(52) U.S. Cl.
  CPC . *H04N 21/23439* (2013.01); *H04N 21/26258* (2013.01); *H04N 21/4307* (2013.01); *H04N 21/6587* (2013.01); *H04N 21/8456* (2013.01)

(56) References Cited

U.S. PATENT DOCUMENTS

| | | | | |
|---|---|---|---|---|
| 2016/0012855 | A1* | 1/2016 | Krishnan | G11B 27/105 386/241 |
| 2016/0057192 | A1* | 2/2016 | Delaunay | H04N 21/238 709/219 |
| 2016/0071238 | A1* | 3/2016 | Kimura | H04N 5/23238 348/36 |
| 2016/0105690 | A1* | 4/2016 | Denoual | H04N 19/46 375/240.02 |
| 2016/0165309 | A1 | 9/2016 | Van Brandenburg et al. | |
| 2016/0353146 | A1 | 12/2016 | Weaver | |
| 2017/0345205 | A1 | 11/2017 | Lai | |
| 2019/0238861 | A1 | 8/2019 | D'Acunto et al. | |

FOREIGN PATENT DOCUMENTS

| | | |
|---|---|---|
| CN | 102413376 A | 4/2012 |
| CN | 103295231 A | 9/2013 |
| CN | 103543831 A | 1/2014 |
| CN | 103918003 A | 7/2014 |
| CN | 105100759 A | 11/2015 |
| EP | 3028472 A1 | 6/2016 |
| FR | 2 988 964 A1 | 10/2013 |
| WO | WO 2015/008774 | 1/2015 |
| WO | 2015014773 A1 | 2/2015 |
| WO | WO 2015/060165 | 4/2015 |
| WO | WO 2015/197815 | 12/2015 |
| WO | WO 2015/197818 A1 | 12/2015 |
| WO | WO 2016/050283 A1 | 4/2016 |
| WO | 2018/069466 A1 | 4/2018 |

OTHER PUBLICATIONS

D'Acunto, L. and Thomas, E., "MPD Signalling of 360 Content Properties for VR Applications," ISO/IEC JTC1/SC29/WG11 MPEG2016/m38605, Geneva, Switzerland, May 2016.

International Search Report for PCT/EP2017/062517, entitled: Spatially Tiled Omnidirectional Video Streaming, dated Mar. 31, 2017.

European Search Report for EP 16172029.7, dated Dec. 20, 2016.

International Standard ISO-IEC 23009-1, Information Technology—Dynamic Adaptive Streaming Over HTTP (DASH)—Part 1 Media Presentation Description and Segment Formats, Draft Third Edition (Dec. 7, 2015).

Movable Type Scripts, Calculate Distance, bearing and more between Latitude/Longitude Points (Sep. 12, 2016). Retrieved from internet via URL: http://www.movable-type.co.uk/scripts/latlong.html.

Wikipedia, Haversine Formula (Sep. 12, 2016).

D'Acunto, Lucia, et al. "Using MPEG DASH SRD for zoomable and navigable video." MMSys (2016).

Information technology—Dynamic adaptive streaming over HTTP (DASH)—Part 1: Media presentation description and segment formats, Amendment 4: Segment Independent SAP Signaling (SISSI), MPD chaining, MPD reset and other extensions, ISK/IEC JTC1/SC29/WG11 MPEG2016/m38605, Geneva, Switzerland, Jul. 29, 2016.

Fogg, "Essential metadata to support virtual reality in AVC and HEVC elementary video streams," Joint Collaborative Team on Video Coding (JCT-VC), 25th Meeting, Chengdu CN, 8 pages, Oct. 14-21, 2016.

PoLin, et al., "Signalling of VR spatial relationship in MPD," International Organization for Standardistion, Coding of Moving Pictures and Audio, MPEG Meeting, Chengdu, China, 15 pages, Oct. 2016.

PoLin, et al., "VR ROI indication," International Organization for Standardistion, Coding of Moving Pictures and Audio, MPEG Meeting, Chengdu, China, 6 pages, Oct. 2016.

Thomas, et al., "ROI coordinates track for VR director's cut signalling," International Organization for Standardistion, Coding of Moving Pictures and Audio, MPEG Meeting, San Jose, CA, 2 pages, Feb. 2016.

* cited by examiner

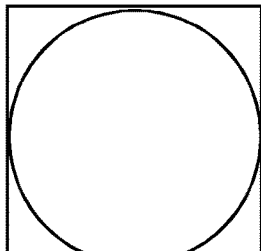
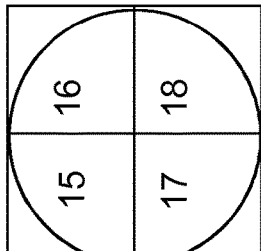
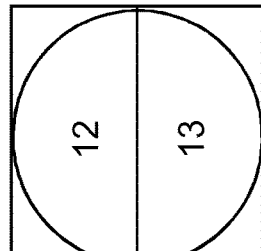
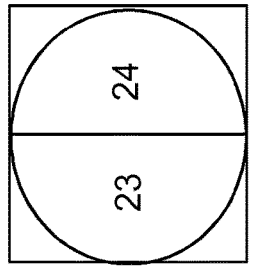
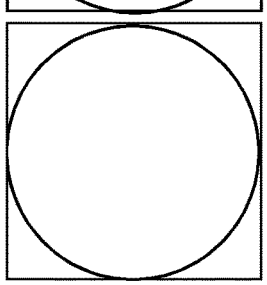
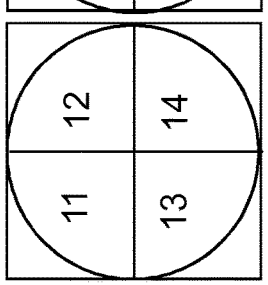
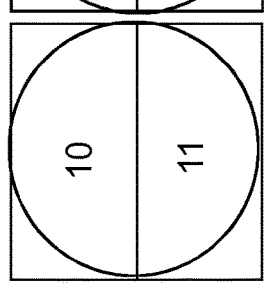
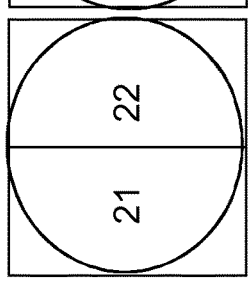
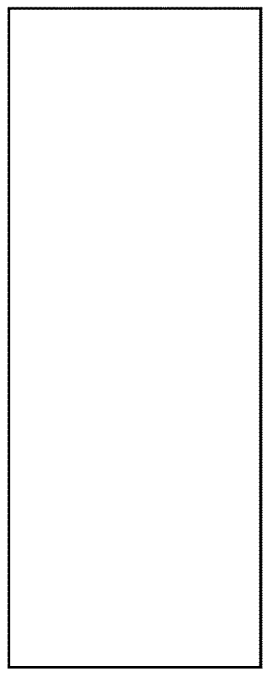
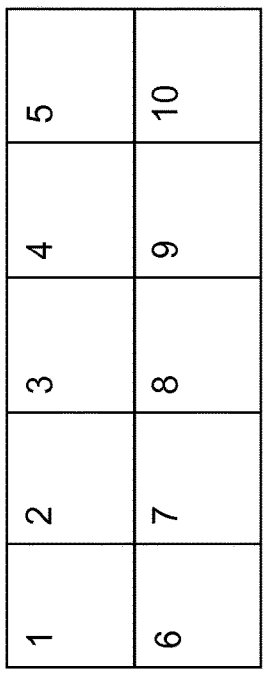
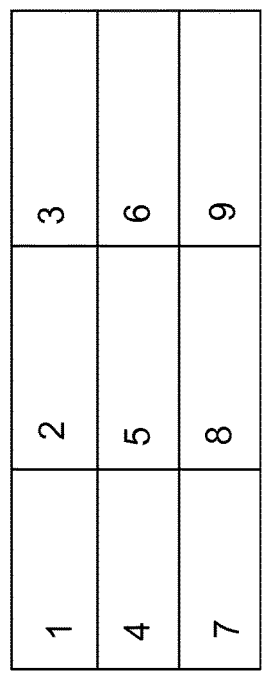
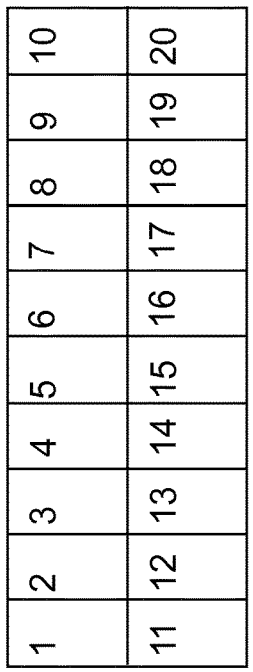
FIG. 9A    FIG. 9B    FIG. 9C    FIG. 9D

SPATIALLY TILED OMNIDIRECTIONAL VIDEO STREAMING

This application is the U.S. National Stage of International Application No. PCT/EP2017/062517, filed on May 24, 2017, which designates the U.S., published in English, and claims priority under 35 U.S.C. § 119 or 365(c) to European Application No. 16172029.7, filed on May 30, 2016 and European Application No. 16001189.6, filed on May 25, 2016. The entire teachings of the above applications are incorporated herein by reference.

FIELD OF THE INVENTION

The invention relates to spatially tiled omnidirectional video streaming, and, in particular, though not exclusively, to methods and systems for streaming spatially tiled omnidirectional video, a client device adapted for processing a spatially tiled omnidirectional video, a data structure for enabling streaming of spatially tiled omnidirectional video to a client device and a computer program product for executing such methods.

BACKGROUND OF THE INVENTION

Advances in both camera and image processing technologies not only enable recording in ever higher resolutions, but also stitching the output of multiple cameras together. This way a set of cameras can together record in full 360 degrees at resolutions higher than 8K×4K. Such video may be referred to as an omnidirectional video.

Omnidirectional video provides new user experiences such as virtual reality (VR) and augmented reality (AR) which are currently gaining momentum in the industry. Streaming high quality VR content however still poses challenges including the high bandwidth requirements that are needed for streaming high-quality omnidirectional video and representing the spherical content in a bitstream.

In practice the available bandwidth will be a trade-off between efficiency and user experience. On one hand, there is the need to provide users the viewpoint they are interested in at a high quality and, at the same time, with minimal latency. This is an extremely difficult aim to meet because, although a viewpoint is spatially limited, users may continuously change their viewpoint within the 360 degrees stream, and the transition from one viewpoint to the other should be smooth.

Omnidirectional videos, which are spherical in nature, are mapped onto one or more planes before encoding to interface with modern video coding standards. Currently no standard way exists to represent a spherical video in a bitstream and as different sphere-to-plane mappings are possible interoperability becomes an issue.

Recently Facebook proposed a proprietary encoding technique that allows reduction of the bandwidth problem with respect to omnidirectional video content. In this technique, an omnidirectional video is mapped to a pyramid wherein the basis of the pyramid represents high-resolution video related to the central FOV of the viewer and wherein the sides of the pyramid are used for video information at the side and the back of the viewer. The video information on the sides of the pyramid is configured such that the resolution is gradually decreasing from the edge of the central FOV towards the back of the viewer. This encoding technique allows a substantial reduction in the file size and thus improving the bandwidth problem of streaming omnidirectional video.

The Facebook technique however is a proprietary solution that is implemented on coding level and is thus not very flexible in terms of interoperability. The solution is based on a hard-coded pyramid-mapping technique that does not provide room for other (further) mapping techniques that may provide even further improvements or that may be used for special applications. Additionally, the special encoding technique proposed by Facebook is not compatible with conventional state-of-the art coding techniques such as HEVC and VP9.

Hence, from the above, it follows that the conventional tiled-based streaming schemes are not suitable for providing an efficient and flexible framework for streaming omnidirectional video data.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In a first aspect, the invention may relate to a method of processing an omnidirectional video by a client device. The omnidirectional video may be associated with a 3D coordinate system for determining a spatial position of video data of the omnidirectional video on a curved surface such as a sphere.

In an embodiment, the method may include: receiving, preferably by the client device, a manifest file, the manifest file comprising a plurality of tile stream identifiers for identifying a plurality of tile streams, the tile streams comprising video frames having image views, whereby the image views of video frames of different tile streams cover different regions of a 2D projection of the omnidirectional video, a region defining a tile; and, selecting, preferably by the client device, on the basis of spatial relation information in the manifest file and on the basis of a viewpoint of a user of the client device a first tile streams associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, tile position and the viewpoint being defined on the basis of coordinates of the 3D coordinate system.

Hence, invention allows a client device to select part of omnidirectional video that corresponds to a particular viewpoint, i.e. a viewpoint that corresponds to a point on the curved surface area representing the direction in which user of the client device is watching, in a way that is agnostic to the 2D projection scheme that is applied to the omnidirectional video data. As the manifest file describes the spatial position of the tiles and the size of a tiles on the basis of a 3D coordinate system that is also used for defining the viewpoint, fast selection of the tiles for the FOV can be achieved. This way the invention may provide an improved interface between streamed content and virtual reality rendering systems. The client device is able to efficiently select the streamed content that corresponds to the user viewpoint which is advantageous for viewpoint-based rendering of omnidirectional video. The invention allows fast tile stream selection of tiles that need to be streamed to a client device, which is essential for providing a good quality of experience.

Additionally, in contract with special coding schemes known from the prior art, the invention allows independent selection of low resolution video tiles and high resolution video tiles. This way, on the basis of tiles of different resolution and different sizes a field of view may be constructed that comprises high resolution video data in the center of the field of view and low resolution video data in the peripheral part of the field view and/or outside the field of view. This way, the amount of data that needs to be streamed to the client device during rendering can be drastically reduced without the need to use a special coding scheme. In fact, the invention allows the use of state-of-the art coding schemes such as AVC, SVC and HEVC.

In an embodiment, the method may further comprise: requesting, preferably by the client device, the selected one or more tile streams from one or more tile stream storage devices, preferably one or more network nodes; and, receiving the video data of the one or more selected tile streams and receiving mapping information, preferably at least part of the mapping information being signaled to the client device in the manifest file, the mapping information providing the client device with information for enabling the client device to map the 2D projected video data of the tile streams as omnidirectional video data onto the curved surface; processing the video data of said received tile streams on the basis of the spatial relation information and the mapping information.

In an embodiment, the mapping information may comprise an indication of the type of 2D projection that is used for projecting the omnidirectional video data onto a planar surface; and, optionally, one or more parameters that are needed for mapping the 2D projected video data onto the curved surface.

Hence, the mapping information allows flexible use of different types of omnidirectional videos that are based on different projection types. The mapping information may inform a rendering engine about the type of 2D projection that was used when the omnidirectional video was generated. Additionally, the mapping information may provide the rendering engine with mapping parameters associated with specific 2D projections so that the rendering engine is able to correctly map the 2D projected video data back on a curved surface that complies with the projection that was used.

In an embodiment the viewpoint may be associated with a field of view of the user, preferably the viewpoint defining a centre point of a field of view of the user. In an embodiment, the selecting may include: selecting a tile stream of a high resolution for a tile position located in at least part of a central part of the field of view; and, selecting a tile stream of a lower resolution than the high resolution for a tile position located in at least part of a peripheral part of the field of view.

Hence, only the central part of the FOV may need the highest quality, while the peripheral parts of the FOV may be accommodated with lower quality streams. By producing different quality layers for the omnidirectional content, and by dividing each quality layer in spatial subparts (tiles), the streaming client obtains the flexibility to download different spatial subparts at different qualities and provide the user with a high quality experience while minimizing bandwidth usage.

The dimensions of the central and peripheral may be determined or selected on the basis of the human FOV and bandwidth considerations. Tiled video content may be generated taking into account the different requirements (in terms of tile size and video quality) of the central and peripheral FOV and at least part of this information may be signaled via a manifest file to the client device. A client device in a video processing device may subsequently use the manifest file to select different video tiles on the basis of the central and peripheral FOV.

In an embodiment said processing the video data may further comprise: decoding the video data of said received tile streams into video frames representing tiles; spatially arranging the video frames of the tiles associated with one time instance and stitching the video frames into one video frame; and, mapping 2D projected video data of the video frame as omnidirectional video data on the curved surface on the basis of the mapping information.

In an embodiment the requesting and receiving of said selected one or more tile streams may be based on an HTTP adaptive streaming protocol, preferably an MPEG DASH streaming protocol or a derivative thereof.

In an embodiment, the manifest file may further comprise one or more representations of a tile stream, preferably said one or more representations including one or more resolutions representations and/or one or more tiling representations.

In an embodiment, the manifest file may comprise one or more spatial relation descriptors (SRD), a spatial relation descriptor comprising one or more SRD parameters for defining the tile position and dimensions of the tile on the basis of coordinates of the 3D coordinate system.

In an embodiment, the one or more spatial relation descriptors (SRD) may comprise one or more SRD parameter for signaling the type of 2D projection that is used for projecting the omnidirectional video data onto a planar surface, preferably the type of 2D projection including an equirectangular projection, a cubic projection, a cylindrical projection or derivatives and/or combinations thereof.

The extended SRD offers advantages regarding interoperability. In fact, an omnidirectional stream may be offered using different 2D mappings at the same time and the source_id parameter of the SRD can indicate to the client that all those streams relate to the same content. The client could therefore select the format that can be best rendered at the client. It is also possible to offer a non-omnidirectional version of the same content, for clients that do not support omnidirectional content, and relate it to the omnidirectional content by using the same value of the source_id.

The extended SRD according to the invention provides an improved interface with VR rendering systems thereby allowing the client device to efficiently process user viewpoints which is important for viewpoint-based rendering of omnidirectional video. Therefore, a tile stream selection method based on this will allow faster selection of the subpart (tile) that needs to be streamed to a client device, which is essential for providing lower latency and consequently good quality of experience.

In some embodiments, the video frames of the 2D projection may be encoded on the basis of a codec that supports spatial tiling. For example, the HEVC standard supports HEVC tiles wherein the video frames are spatially divided in a grid of tiles. These HEVC tiles are encoded such that each of the tiles can be processed by a different core of a microprocessor. The media data associated with an HEVC tile may be encoded such that they do not have any spatial decoding dependency on the media data of other tiles of the same video frame. Further, the media data associated with a tile are encoded such that they do not have any temporal decoding dependency on the media data of other tiles of earlier or future video frames. In that case, the video data of each HEVC tile may be stored as HEVC tile tracks, i.e. HEVC tile files, on a media source. These tile tracks may have a data container format based on ISO/IEC 14496-12 ISO Base Media File Format (ISOBMFF) or ISO/IEC 14496-15 Carriage of NAL unit structured video in the ISO Base Media File Format. In that case, the content processing device should comprise an HEVC client that supports tiles which can decode the requested HEVC tile streams into a single video frame.

In a further aspect, the invention is related to a client device for processing an omnidirectional video, said omnidirectional video being associated with a 3D coordinate system for determining a spatial position of video data of said omnidirectional video on a curved surface, the client device comprising: a computer readable storage medium having at least part of a program embodied therewith, the computer readable storage medium comprising a manifest file; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a manifest file, the manifest file comprising a plurality of tile stream identifiers for identifying a plurality of tile streams, the tile streams comprising video frames having image views, whereby the image views of video frames of different tile streams cover different regions of a 2D projection of the omnidirectional video, a region defining a tile; and, selecting on the basis of spatial relation information in the manifest file and on the basis of a viewpoint of a user of the client device a first tile streams associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, tile position and the viewpoint being defined on the basis of coordinates of the 3D coordinate system.

In an embodiment the executable operations may further comprise: requesting the selected one or more tile streams from one or more tile stream storage devices, preferably one or more network nodes; and, receiving the video data of the one or more selected tile streams and receiving mapping information, preferably at least part of the mapping information being signaled to the client device in the manifest file, the mapping information providing the client device with information for enabling the client device to map the 2D projected video data of the tile streams as omnidirectional video data onto the curved surface; processing the video data of said received tile streams on the basis of the spatial relation information and the mapping information.

In an embodiment, the manifest file may comprise one or more spatial relation descriptors (SRD), a spatial relation descriptor comprising one or more SRD parameters for defining the tile position and dimensions of the tile on the basis of coordinates of the 3D coordinate system.

In an embodiment, the manifest file may comprise one or more spatial relation descriptors comprising one or more SRD parameters for signaling the type of 2D projection that is used for projecting the omnidirectional video data onto a planar surface.

In an embodiment, the type of 2D projection including an equirectangular projection, a cubic projection, a cylindrical projection or derivatives and/or combinations thereof.

In another aspect, the invention may relate to a method of processing an omnidirectional video by a client device, said omnidirectional video being associated with a 3D coordinate system for determining a spatial position of video data of said omnidirectional video on a curved surface, preferably a sphere, said method comprising: receiving, preferably by the client device, a manifest file, the manifest file comprising a plurality of tile stream identifiers for identifying a plurality of tile streams, the tile streams comprising video frames having image views, whereby the image views of video frames of different tile streams cover different regions of a 2D projection of the omnidirectional video, a region defining a tile;

selecting, preferably by the client device, on the basis of spatial relation information in the manifest file and on the basis of a viewpoint of a user of the client device one or more tile streams with a first resolution and a second stream associated with a second resolution, the second resolution being lower than the first resolution (e.g. a low resolution base layer), wherein the spatial relation information defines for each tile a tile position and wherein the viewpoint defines a viewing direction of the user, tile position and the viewpoint being defined on the basis of coordinates of the 3D coordinate system.

Hence, in this embodiment high resolution video data can be requested on the basis of tile streams for rendering video data in a central part of the FOV of a user while a non-tiled low resolution base layer may be requested for a peripheral part and/or areas outside the FOV of the user.

In an embodiment, the non-tiled and tiled video representations may be coded on the basis of an scalable video coded (SVC) as known from the Annex G extension of the H.264/MPEG-4 AVC video compression standard. Hence, in that case, the non-tiled low-resolution layer may be formatted as a SVC base layer, while the tiled medium and high resolution representations may be formatted as SVC enhancement layers In an aspect, the invention relates to a non-transitory computer-readable storage media for storing a manifest file for a client device, said client device being configured to process an omnidirectional video by on the basis of said manifest file, said omnidirectional video being associated with a 3D coordinate system for determining a spatial position of video data of said omnidirectional video on a curved surface, preferably a sphere, said manifest file comprising computer readable data, said data comprising: a plurality of tile stream identifiers for identifying a plurality of tile streams, the tile streams comprising video frames having image views, whereby the image views of video frames of different tile streams cover different regions of a 2D projection of the omnidirectional video, a region defining a tile; spatial relation information, the spatial relation information defining for each tile a tile position, tile position and the viewpoint being defined on the basis of coordinates of the 3D coordinate system; and, mapping information for providing the client device with information for enabling the client device to map the 2D projected video data of the tile streams identified in the manifest file as omnidirectional video data onto the curved surface.

In an embodiment, the computer readable data of the manifest file further comprise:
one or more spatial relation descriptors (SRD), a spatial relation descriptor comprising one or more SRD parameters for defining the tile position and dimensions of the tile on the basis of coordinates of the 3D coordinate system; and/or, one or more SRD parameters for signaling the type of 2D projection that is used for projecting the omnidirectional video data onto a planar surface, preferably the type of 2D projection including an equirectangular projection, a cubic projection, a cylindrical projection or derivatives and/or combinations thereof.

The invention may also relate to a program product comprising software code portions configured for, when run in the memory of a computer, executing any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 9A-9D illustrate different tiling representations of different video quality for use with a client device for omnidirectional video according to an embodiment of the invention.

DETAILED DESCRIPTION

Figure 1:
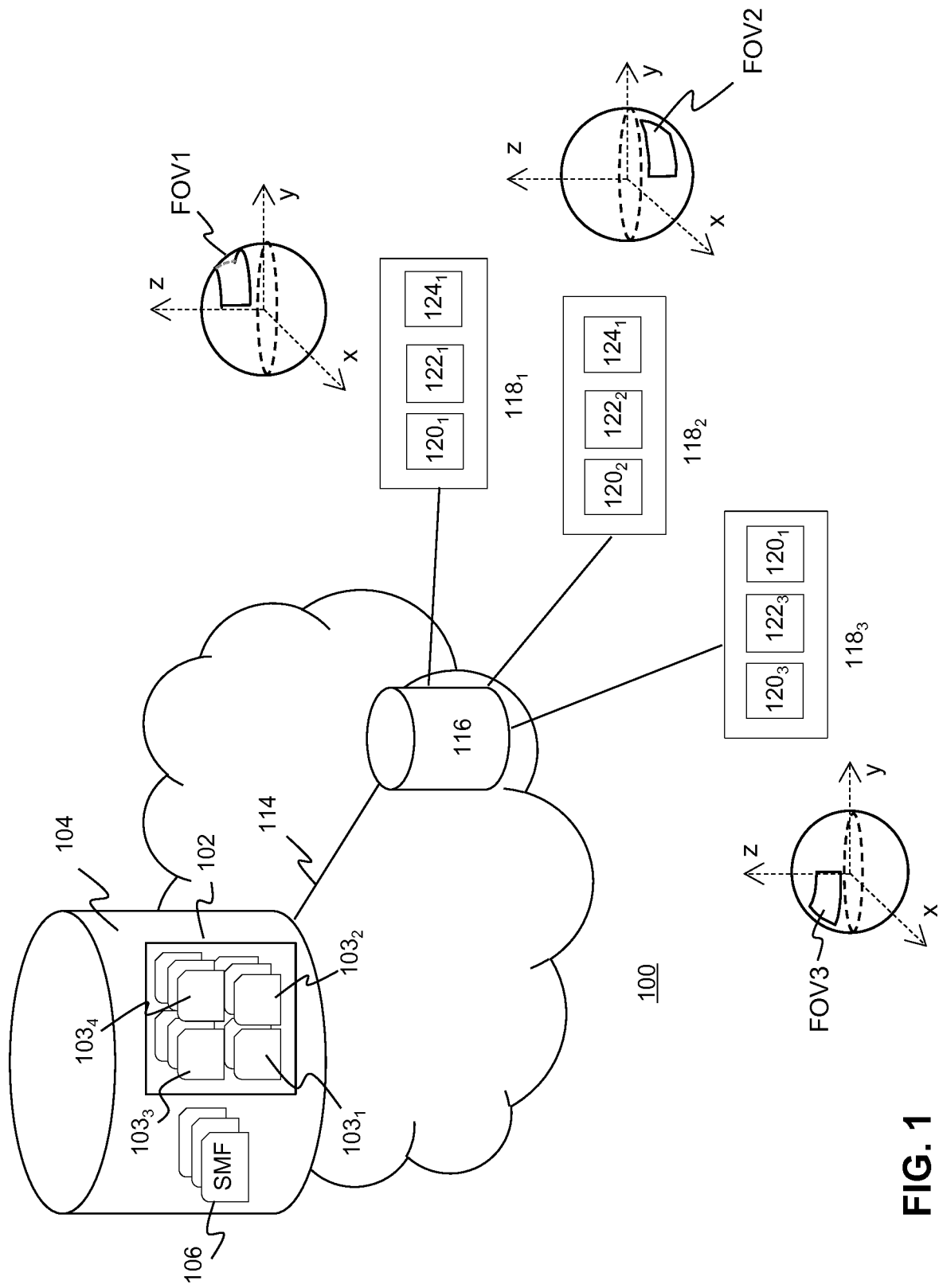
FIG. 1 depicts schematics of a video streaming system for omnidirectional video according to an embodiment of the invention.

FIG. 1 depicts schematics of a video streaming system for omnidirectional video according to an embodiment of the invention. In particular, FIG. 1 depicts a video streaming system 100 comprising one or more media sources 104, e.g. one or more video servers, configured for storing tiled omnidirectional video data 102 on the basis of a predetermined data format.

The tiled omnidirectional content may be stored as individual tile stream files $103_{1-4}$ wherein the video frames of a tile stream represents a subregion (a tile) of a video frame representing a two dimensional projection of omnidirectional video content onto a rectangular plane. The tile stream identifiers (e.g. URLs) and the spatial relation between the different subregions (tiles) of different tile streams are stored in a so-called spatial manifest file 106. The concept of tiled content is described hereunder in more detail.

The one or more media sources are adapted for streaming the video data on the basis of a streaming protocol to omnidirectional video processing devices $118_{1-3}$ (hereafter referred to in short as video processing devices). A media source may be part of a content delivery network (CDN) that is configured for efficient delivery of media data to a large number of video processing devices.

The video processing devices are configured to process omnidirectional video data and to render the omnidirectional video data for display. A non-limiting example of such video processing device is a head-mounted display (HMD) that is used for virtual reality and augment reality applications. An HMD comprises one or more sensors for tracking head, eye and/or body movements in order to determine a viewpoint, i.e. a direction in 3D space in which the user of the HMD is looking. A viewpoint may be expressed on the basis of a coordinate system, such as a spherical coordinate system, that is suitable for defining a direction in 3D space. A HMD is further characterized by a field of view (FOV), i.e. an area of the omnidirectional video the HMD is able to display for a particular viewpoint and a given moment in time. The FOV of an HMD may be expressed on the basis of a spherical coordinate system.

Each of the video processing devices may comprise a client device $120_{1-3}$ configured for requesting omnidirectional media data from the network, in particular network nodes such as video servers 104 and/or video caches 116. The video processing devices are further configured for receiving requested video data and for buffering the media data for input to a media engine $122_{1-3}$. The media video may comprise one or more processors, e.g. graphical processing units (GPUs), that can execute one or more decoding instances for decoding the media data into video frames.

During content generation, the omnidirectional video data may be generated on the basis of a predetermined mapping, e.g. an equirectangular projection. Hence, the video frames of the mapped omnidirectional video comprise pixels that may represent an equirectangular projection of the omnidirection video data. These video frames may be subjected to a tiling process wherein a video frame is spatially divided in so-called video tiles (or in short tiles). The tiling process may include cropping video data (pixels) of an area that corresponds to a tile out of a video frame, encoded the cropped video data and stored the encoded video data as a video file. Repeating this process for different tiles results in a set of video files which can be separately accessed and streamed to a client device. A content processing device should comprise a client for requesting one or more tile streams, one or more decoders for decoding the video data of the different tile streams; and, a rendering engine for stitching the video frames together into a single video frame.

Alternatively, in some embodiments, the video frames of the 2D projection may be encoded on the basis of a codec that supports spatial tiling. For example, the HEVC standard supports HEVC tiles wherein the video frames are spatially divided in a grid of tiles. These HEVC tiles are encoded such that each of the tiles can be processed by a different core of a microprocessor. The media data associated with an HEVC tile may be encoded such that they do not have any spatial decoding dependency on the media data of other tiles of the same video frame. Further, the media data associated with a tile are encoded such that they do not have any temporal decoding dependency on the media data of other tiles of earlier or future video frames. In that case, the video data of each HEVC tile may be stored as tile tracks on a media source 104. These tile tracks may have a data container format based on ISO/IEC 14496-12 ISO Base Media File Format (ISOBMFF) or ISO/IEC 14496-15 Carriage of NAL unit structured video in the ISO Base Media File Format. In that case, the content processing device should comprise an HEVC client that supports tiles which can decode the requested tile streams into a single video frame.

Different transport protocols may be used to transmit an encoded bitstream to a client device. For example, in an embodiment, an HTTP adaptive streaming (HAS) protocol may be used for delivering a tile stream to a client device. In that case, the sequence of video frames in the tile stream may be temporality divided in temporal segments typically comprising 2-10 seconds media data. Such temporal segment may be stored as a media file on a storage medium. In an embodiment, a temporal segment may start with media data that have no temporal coding dependencies on other frames in the temporal segment or other temporal segments, e.g. an I frame or an equivalent thereof, so that the decoder can directly start decoding media data in the HAS segment. Optionally, an initialisation segment may be provided along with the media segments with the sole purpose of initialising the decoder with parameters pertaining the media stream, e.g. spatial resolution, frame rate, codec profile and level, etc. . . . .

The client device may be configured to select a set of tiles associated with a viewpoint of a video processing device. In an embodiment, the client device may perform this selection on the basis of information in a so-called manifest file 106, i.e. one or more data structures comprising metadata for the client device in order to select and request tile streams from the network.

A manifest file may comprise stream identifiers, e.g. URLs, or information for determining such stream identifiers. The stream identifiers may include one or more tile stream identifiers. The manifest file may further comprise spatial relationship information for signalling a client device on the spatial relationship that exists between the tiles. In an embodiment, a tile stream identifier may be associated with tile position information, i.e. information for signalling a client device about the position of a tile in a tiled video frame of a tile stream. In order to allow fast selection of tiles, the tile position information may be represented in spherical coordinates.

A manifest file may further comprise location information regarding one or more network nodes, e.g. one or more URLs and/or network addresses of network nodes. These network nodes may relate to media sources 104 and/or media caches 116 that are configured to transmit requested media data to a client device. A client device may use a manifest file to select one or more tile streams on the basis of a viewpoint that is provided by the video processing device to the client device.

A client device $120_{1-3}$ in a media device $118_{1-3}$ may receive and buffer the media data of the tiles and prepare the media data as one or more bitstreams for input to a media engine $122_{1-3}$. The media engine may comprise one or more decoder for decoding the media data of the tiles into video frames. Then, the generated video frames are forwarded to a rendering engine $124_{1-3}$ that is coupled to the media engine. The rendering engine may comprise frame buffers for buffering the video frames and a fusion processor (not shown) for fusing video frames of the different tile streams into a single video frame 126 representing equirectangular version of a field of view (FOV) that needs to be transformed into a spherical representation for rendering.

Figure 2A:
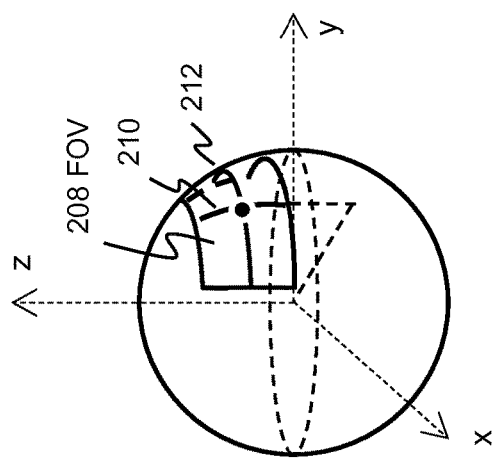
FIG. 2A-2C illustrate a viewpoint in a 3D coordinate system of a client device for omnidirectional video according to an embodiment of the invention.
Figure 2B:
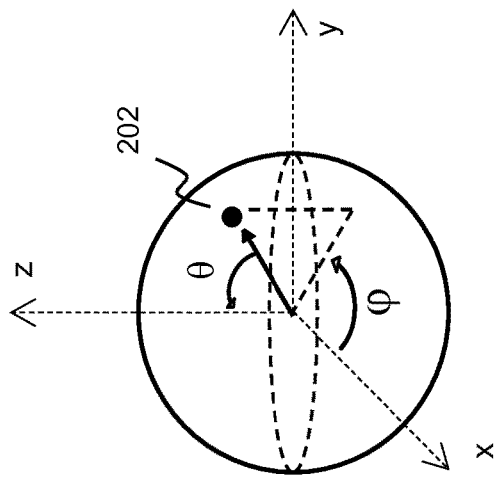
Figure 2C:
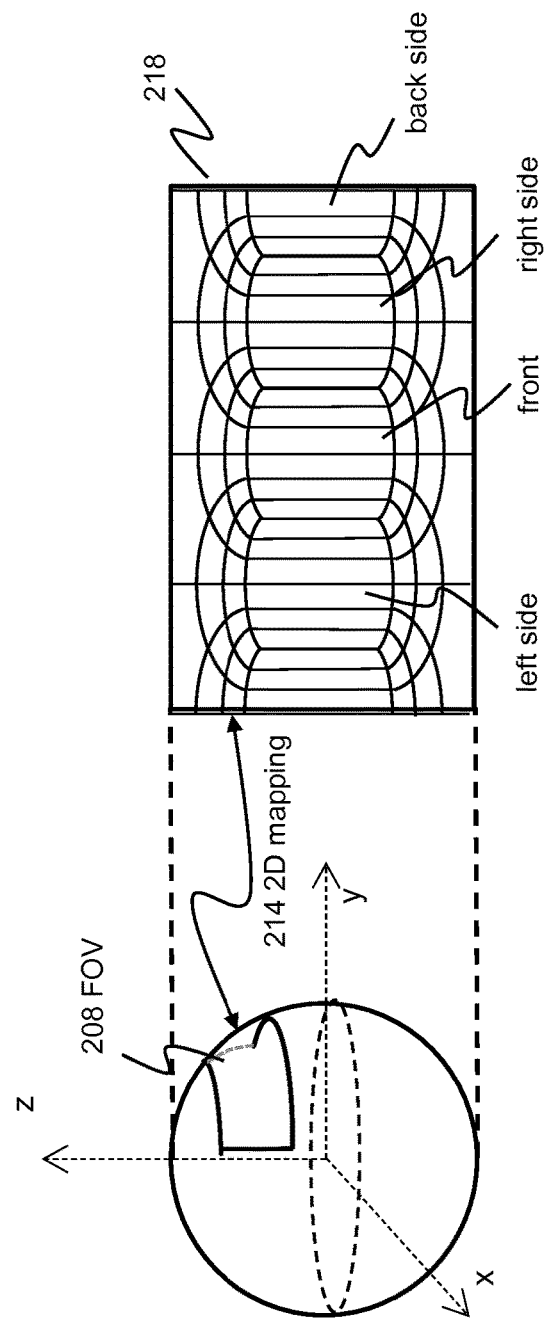

FIG. 2A-2C illustrate a viewpoint in a 3D coordinate system of a client device for omnidirectional video according to an embodiment of the invention. FIG. 2A illustrates an example of a 3D coordinate system that is suitable for use with omnidirectional. In particular, FIG. 2A illustrates a 3D spherical coordinate system defining a viewpoint 202 on a sphere wherein the direction of the vector extending from the origin to the viewpoint defines a viewing direction of a user of an omnidirectional video processing device in 3D space. The direction may be defined by the polar angle $\theta$ (also referred to as zenith angle or yaw angle) and azimuthal angle $\varphi$ (sometimes referred to as pitch angle). These parameters are related to the geographical coordinate system wherein a position on a spherical object is defined by the latitude and longitudes.

FIG. 2B defines a field of view (FOV) of an observer at the origin looking in the direction of the viewpoint. The field of view may be defined as the extent of the observable world that is seen by the observer at any given moment. In this particular case, for an observer, the user of an omnidirectional video processing device, the observable world may be regarded as the omnidirectional content projected on the sphere and the field of view defines the part of the omnidirectional content that can be presented by the omnidirectional video processing device to the user at a given moment in time.

As shown in FIG. 2B for omnidirectional video, the FOV of the observer at the origin may be defined as an area on the surface of the sphere in the direction of the viewing direction of the observer. The FOV limits the amount of the omnidirectional video that can be presented to the observer wherein the extend (dimensions) of the FOV may be defined in terms of spherical coordinates, e.g. the zenith and azimuthal angle. In an embodiment, the FOV may be defined by the view point $\theta_o, \varphi_o$ as the center of the FOV and $\theta_o \pm \Delta\theta_o, \varphi_o \pm \Delta\varphi$ defining the "width" and "height" of the FOV.

In order to allow omnidirectional video to be coded on the basis of conventional coding schemes, omnidirectional video is first processed into a format that can be input to conventional an encoder. As conventional codecs can only handle planar rectangular video frames, the video data are typically mapped onto the shape of a conventional rectangular video frame format. Different mappings can be used. For example, FIG. 2C depicts an equirectangular projection of the omnidirectional content onto a rectangular plane. As shown by the grid lines, such mapping results into a video picture 218 comprising a front-, left-, right- and back-side of the sphere, wherein towards the north and south pole objects get distorted in the picture due to the projection. On the decoder size, the equirectangular projection needs transformed back into content that is projected onto a curved, e.g. spherical, surface.

Depending on the way the omnidirectional video generated and depending on the type of VR application other different types of projections may be used. The type of mapping and the parameters needed for the mapping is referred to as mapping information.

While the 3D coordinate system for describing the viewpoint and the FOV in FIG. 2A-2C represents a spherical coordinate system other curved linear coordinate systems that are suitable for describing a curved surface in 3D may also be used.

During rendering only the part of the video data that correspond to the field of view 208 FOV will be played out. To that end, the video frames are spatially divided in tiles and the video data of individual tiles are processed and stored in separate files such that they can be individually accessed and requested by the client. Embodiments regarding creation and playback of tiled omnidirectional content are described hereunder in more detail.

Figure 3A:
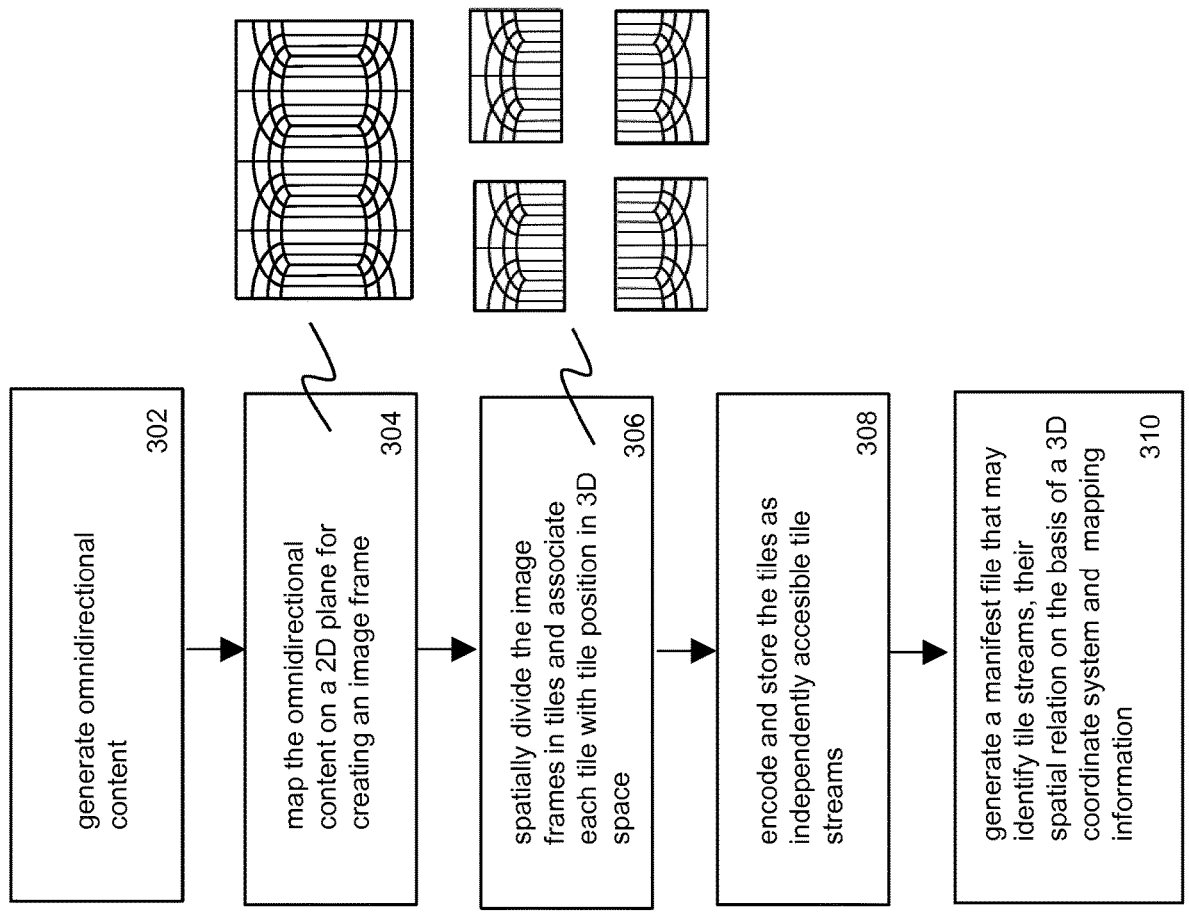
FIG. 3A-3B illustrate flows for generation and playout of tiled omnidirectional video according to various embodiments of the invention.
Figure 3B:
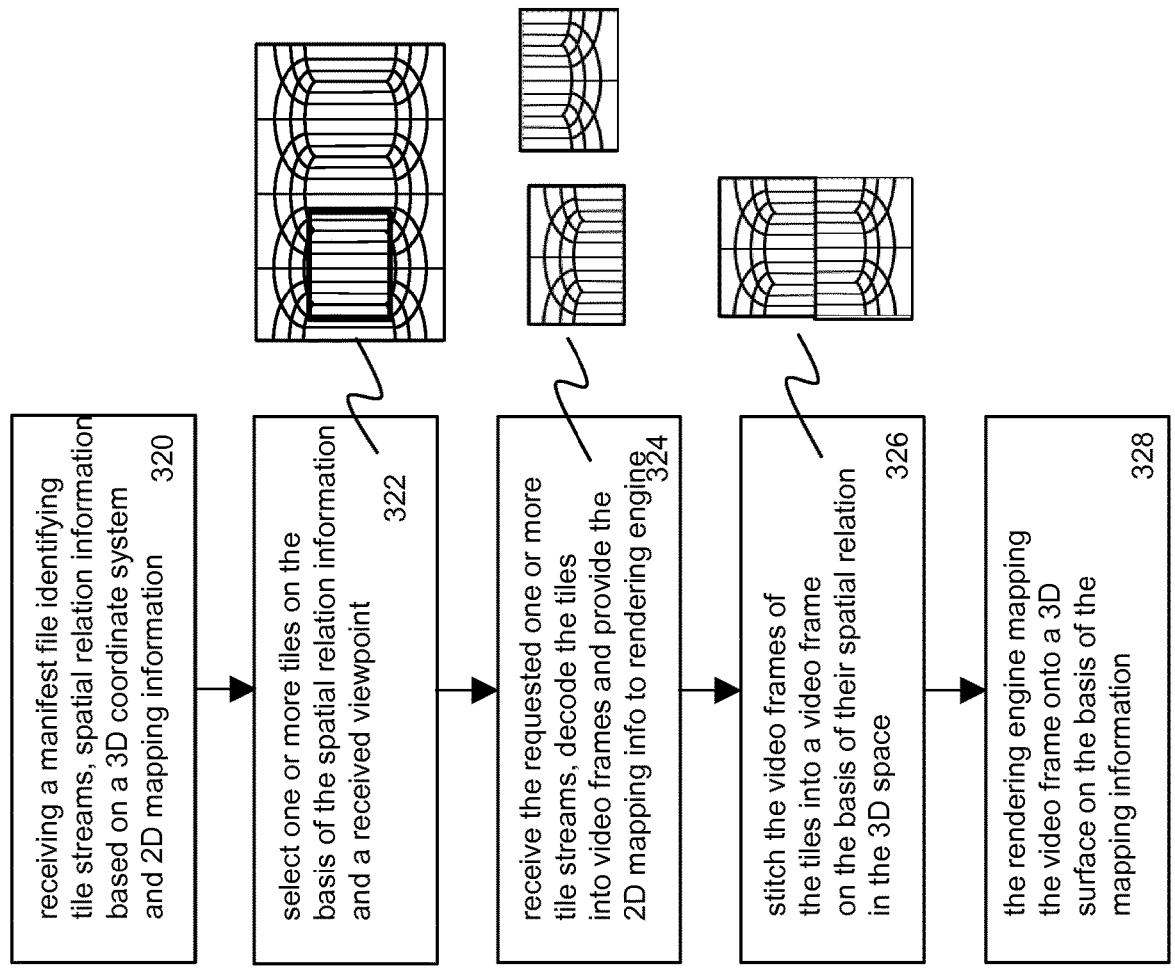

FIG. 3A-3B illustrate flows for generation and playout of tiled omnidirectional video according to various embodiments of the invention. FIG. 3A depicts the generation of tiled omnidirectional video. In a first step 302 omnidirectional video data may be captured wherein the captured video data are a function of a viewing orientation in a 3D space. Thereafter, the images may be processed into an 2D rectangular video frame (step 304) wherein the pixels represent an equirectangular projection of the pixels in the cube map. Such video frame may be referred to as an equirectangular video frame. In some embodiments, the omnidirectional video may be captured into different qualities, e.g. SD, HD and UHD and higher.

Equirectangular video frames may be spatially divided into tiles (step 306) so that each tile represents an area of the curved (e.g. spherical) surface which is used by the video processing device to display the omnidirectional video data. Each tile may be associated with a tile position on the curved surface that can be expressed in terms of a 3D coordinate system, e.g. a spherical coordinate system. The relation between the tile in the video frame and the area on the spherical surface is determined according to the mapping that is used (as described with reference to FIG. 2C).

The tiling process may include cropping video data (pixels) of an area out of a equirectangular video frame. Such area may be referred to as a video tile or in short a tile. Repeating the cropping process for the same area in a sequence of equirectangular video frames results in a sequence of tiles. The video date of these tiles may be encoded using any known codec e.g. AVC, SVC, HEVC, VP9, etc. and stored into a video tile file. Applying this process for different areas in the equirectangular video frames out of a video frame results in a set of video tile files which can be separately accessed and streamed as one or more tile streams to a client device (step 308). Hence, the tile streams comprise video frames having image views (a video tile or in short a tile), whereby the image views of video frames of different tile streams cover different regions of a 2D projection of the omnidirectional video.

Moreover, this content generation process may be repeated for different qualities of the same omnidirectional video so that video tile files for different tiles and for different video qualities generated. Similarly, this content generation process (steps 304 and 306) may be repeated to generate different 2D projections, such as a cubic or a cylindrical 2D projection.

In a further embodiment, different tiling grids may be used. For example, large tiles may be used for streaming low quality video, while small tiles (tiles grids with small granularity) may be used for streaming high quality video. Similarly, depending on the application the size of the tiles in the tile grid may differ. Alternatively, and/or in addition the different tiling grids may be generated on the basis of the same content.

In an embodiment, an HTTP based streaming protocol such as MPEG DASH may be used. In that case, a video tile file may be temporally segmented in short segment file of a predetermined durations (typically 2-10 seconds).

During the generation of video tile files, a so-called spatial manifest file is generated. The manifest file may comprise metadata for a client device in the video processing device that enables the video processing device to request tile streams and to process the video data in the tile streams. To that end, the manifest file may comprise tile identifiers, e.g. URLs, for identifying a network address for requesting a tile stream. In some embodiments, the tile identifier is associated with quality information so that the client device can select from different video qualities.

Further, the manifest file may include spatial relationship information for signalling a client device on the spatial relationship that exists between the tiles. To that end, a tile identifier may be associated with coordinates defining an area of the curved (e.g. spherical) surface which is used by the video processing device to display the omnidirectional video. Further, the manifest file may include mapping information, i.e. information that is needed by the client device in order to display the video data of selected video tiles. The mapping information may e.g. include an identifier of the type of mapping that is used for generating the tiled omnidirectional video content.

In case of MPEG DASH, the manifest file (referred to as the media presentation description (MPD) in DASH), may comprise a spatial relationship descriptor (SRD). In an embodiment, the SRD may be extended to signal the DASH client on the spatial relationship information described the position of the tiles on the basis of a 3D coordinate system that is used to describe (to model) the curved surface that is used to display the omnidirectional video. In another embodiment, the SRD may be configured to signal the DASH client on type of mapping that is used for generating the tiled omnidirectional video content. Examples of such SRDs are described hereunder in more detail.

The tiled omnidirectional video identified in the manifest file, may also be used in combination with non-tiled omnidirectional video. For example, in an embodiment, the tile streams identified in the manifest file may relate to medium and high quality representations of the omnidirectional video, while a non-tiled version of the omnidirectional video may relate to a low-resolution version. This way only the relevant high-resolution tile streams, i.e. the tile streams that carry the video data for the central part of the FOV, are transmitted to the client device FIG. 3B depicts a flow diagram of processing tiled omnidirectional video by a client device. The process may start by the client device receiving a manifest file in which tile streams are identified wherein the tiles have a spatial relationship that may be defined on the basis of the 3D coordinate system that is used to describe the surface that is used to display the omnidirectional video. The manifest file may further comprise mapping information in order to signal the client device about the type of mapping that is used to generate the omnidirectional video data (step 320).

The client device may comprise a view point from the video processing device. The viewpoint may be defined in terms of a viewing direction in the 3D coordinate system that is used to describe the surface that is used to display the omnidirectional video. Based on the received viewpoint, the client device may determine a current FOV. Thereafter, it may use the information in the manifest file to select one or more neighbouring tiles that at least partly cover the area on the curved surface that defines the current FOV (step 322).

Thereafter, the client device may request the selected tiles on the basis of the tile identifiers, e.g. URLs by sending one or more HTTP messages to one or more network nodes that are configured to deliver (transmit) the requested tile streams to client devices.

In an embodiment, the client device may select the video quality of a tile on the basis of the position of the tile in the FOV. For example, when a substantial part of the tile is located in the central part of the FOV, i.e. within a certain distance of the viewpoint, the client device may select a high quality tile. When a substantial part of the tile is located in a peripheral part of the FOV (outside the central part of the FOV), the client device may select a tile having a quality that is lower (e.g. medium of low quality) than the video quality of the tiles selected for the central part of the FOV.

Once the video streams are received, the video data of the tiles may be decoded into video frames. Further, the client device may signal a omnidirectional video rendering engine the type of mapping that is used to generate the omnidirectional video. On the basis of this information the rendering engine may configure itself so that it capable of rendering the video onto a curved surface (step 324). In some embodiments, the client device may use mapping parameters in the mapping information.

The video frames representing the tiles that are selected by the client device may be stitched together into a single video frame using the spatial relation information in the manifest file (step 326). The stitched video frames may than be provided to the rendering engine in order to project the video data on a curved surface that is used to display the omnidirectional video (step 328). The projection step may be include mapping the 2D projected video data back to the curve surface. This may include subjecting the video data to one or more mathematical image processing operations.

Hence, the tiled omnidirectional video described in this disclosure allows fast selection of one or more video tiles that represent the FOV of the observer. The fast selection is based on the fact that the tiles are associated with spatial relationship information is based on the 3D coordinate system that is used to describe the surface that is used to display the omnidirectional video. This way the FOV of the observer in 3D space can be directly linked to the tiles that built the FOV.

Moreover, the mapping information allows flexible use of different types of omnidirectional videos as the mapping information informs the rendering engine about the type of mapping that was used when the omnidirectional video was generated and provides the rendering engine with mapping parameters so that the rendering engine is able to correctly project the content on a curved surface that complies with the mapping that was used.

In MPEG DASH the SRD may be used to signal the spatial relation between the tiles and the mapping information. The SRD allows to divide the stream in different spatial subparts (tiles) thus giving to the client the possibility to only stream the subpart the user is interested into. In VR the user will be interested, at any moment in time, in only a small subset of the 360 degrees stream, limited by the FOV the VR headset in use (which currently is around 100 degrees), and eventually the human eye vision (up to 270 degrees).

Furthermore, of this FOV, only the central part in focus may need the highest quality, while the peripheral parts of the FOV may be accommodated with lower quality streams. Hence, by producing different quality layers for the omnidirectional content, and by dividing each quality layer in spatial subparts (tiles), the streaming client obtains the flexibility to download different spatial subparts at different qualities and provide the user with a high quality experience while minimizing bandwidth usage.

For example, if the omnidirectional content is offered in three quality layers, the client might stream the central part of the user's FOV at the highest quality, the peripheral part of the field of view at the middle-level quality and the full 360 degrees video at the lowest quality. Streaming the full 360 degrees at the lowest quality can be useful to avoid the "black screen" effect when the user changes her view point, as there will still be content to be shown to her.

The extended SRD offers advantages regarding interoperability. In fact, an omnidirectional stream may be offered using different 2D mappings at the same time and the source_id parameter of the SRD can indicate to the client that all those streams relate to the same content. The client could therefore select the format that can be best rendered at the client. It is also possible to offer a non-omnidirectional version of the same content, for clients that do not support omnidirectional content, and relate it to the omnidirectional content by using the same value of the source_id.

The SRD that is known from the MPEG DASH standard only describes an SRD that is suitable for 2D content. Different spatial subparts are identified by the position and size that they occupy on a 2-dimensional space. This approach is intended for 2-dimensional video content. However, as already described above in detail, for omnidirectional video, depending on the uses, different methods exist to represent (spatial subparts of) such 360 degrees video in the bitstream. For example, equirectangular, striped spherical schemes, cylindrical schemes or schemes that represent a convex polyhedron/solid (such as a cube or a pyramid) are known.

Virtual reality video processing devices are configured to render part of omnidirectional video that corresponds to a particular viewpoint, i.e. a viewpoint that corresponds to a point on the curved surface area representing the direction in which the viewer is watching. Therefore, it is advantageous that the spatial position and the size of a particular subpart (tile) is described in relation to its true representation on a curved surface (e.g. a sphere) that is used to display the FOV part of the omnidirectional video to the user.

Therefore, in an embodiment, a new SRD parameter referred to as "space" is introduced that is configured to signal the type of the omnidirectional video representation to the client. This parameter may also imply or be associated with one or more parameters that further characterize a specific omnidirectional video representation. For example, in an embodiment, a cylindrical space may be signed in the SRD with as space="cylindrical", and an additional SRD parameter that characterizes the cylinder, which may have a certain, e.g. height=150).

In a further embodiment, the parameters object_x and object_y in the SRD may define the central position of the spatial subpart (as opposed to conventional SRD where they represent the position of the top-left corner of said subpart). Furthermore, object_x and object_y may identify yaw and pitch angles, respectively. The yaw angle may range from 0 to 360 where 0=North, 90=East, 180=South and 270=West and the pitch angle may range from from −90° (Nadir) to +90° (Zenith).

The extended SRD according to the invention provides an improved interface with VR rendering systems thereby allowing the client device to efficiently process user viewpoints which is important for viewpoint-based rendering of omnidirectional video. Therefore, a tile stream selection method based on this will allow faster selection of the subpart (tile) that needs to be streamed to a client device, which is essential for providing lower latency and consequently good quality of experience.

The SRD parameters object_width and object_height may represent the width and height of a tile in terms of angular length of the object on the 360 degrees surface. Specifically, the width of the object is represented by the degree of arc of its width measured on the parallel passing through the center of the object and the height is represented by the degree of arch of its height measured on the meridian passing through the center of the object as e.g. shown in FIG. 2B.

Further, in VR applications video content is constantly displayed in front of the eyes of the user. However, it is well known that peripheral human vision is not sensitive to high frequencies (fine details). Therefore, in further embodiments, the tiling schemes in this disclosure may be optimized in view of the FOV of the human eyes. Hence, the region that constitutes the centre of the user's FOV may be displayed on the basis of high-quality video, while the regions that correspond to the peripheral view may be provided in a standard quality thus saving bandwidth.

Figure 4:
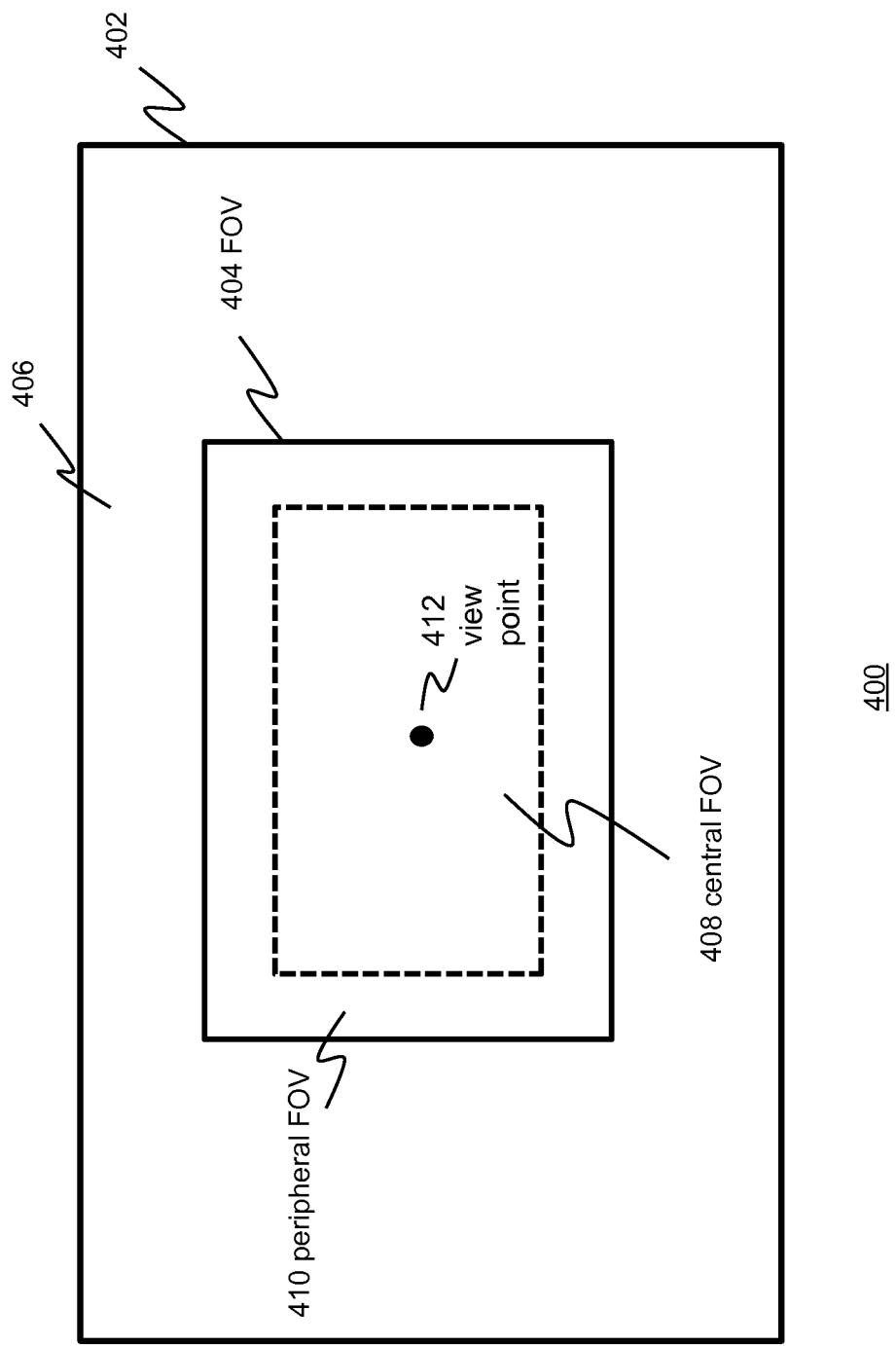
FIG. 4 illustrates a field of view of a client device for tiled omnidirectional video according to an embodiment of the invention.

FIG. 4 illustrates a field of view of a client device for tiled omnidirectional video according to an embodiment of the invention. FIG. 4 depicts a viewpoint of a user looking in the direction of a curved surface 402 which is used displaying omnidirectional content that is based on an equirectangular mapping. Here, the FOV 404 defines the part of the content that is shown to the view and the part of the content 406 that is not shown to the view. FOV is further divided in a central FOV 408 and a peripheral FOV 410. In the central part of the FOV high quality content may be displayed while in the periphery a lower quality may be selected.

The dimensions of the central and peripheral may be determined or selected on the basis of the human FOV and bandwidth considerations. Tiled video content may be generated taking into account the different requirements (in terms of tile size and video quality) of the central and peripheral FOV and at least part of this information may be signaled via a manifest file to the client device. A client device in a video processing device may subsequently use the manifest file to select different video tiles on the basis of the central and peripheral FOV.

Different examples of omnidirectional video data generated on the basis of different mappings (represented by means of different 2D projections) are described hereunder.

An example for an equirectangular 2D projection is provided in FIGS. 5A-5D and FIG. 6 below. In the equirectangular 2D projection, the omnidirectional content is represented in the bitstream as a rectangular. The longitude is mapped to the horizontal coordinate, and the latitude to the vertical coordinate. The equirectangular 2D projection is the default output format of a rotating (scanning) panorama camera equipped with a fisheye lens and is currently one of the most common formats used for omnidirectional video.

Figure 5A:
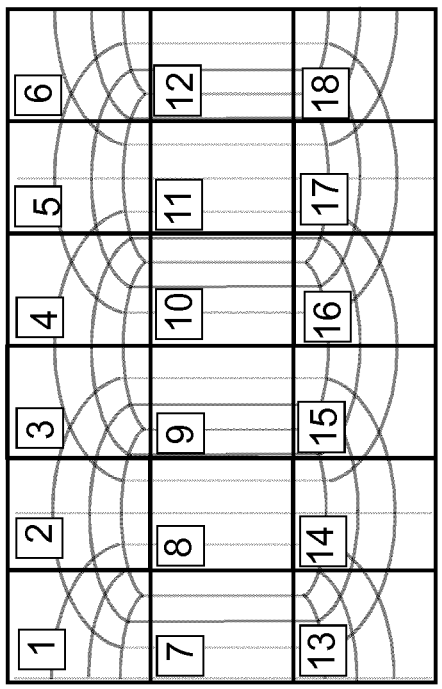
FIG. 5A-5D illustrate different tiling representations of different video quality for use with a client device for omnidirectional video according to an embodiment of the invention.
Figure 5B:
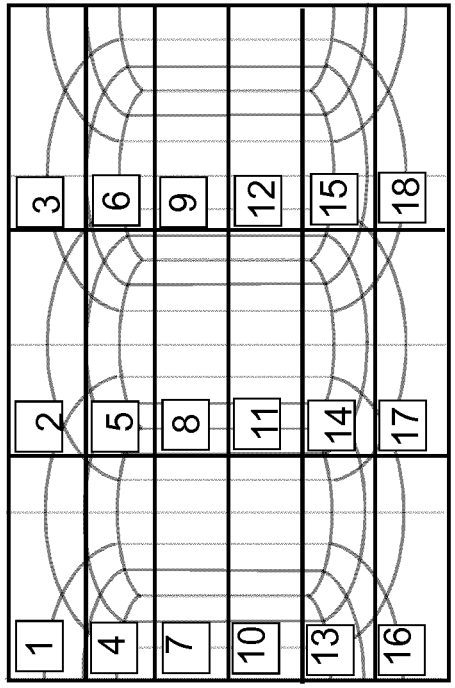
Figure 5C:
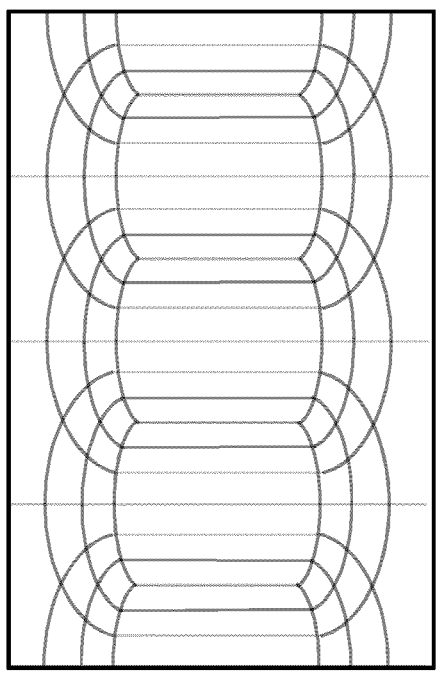
Figure 5D:
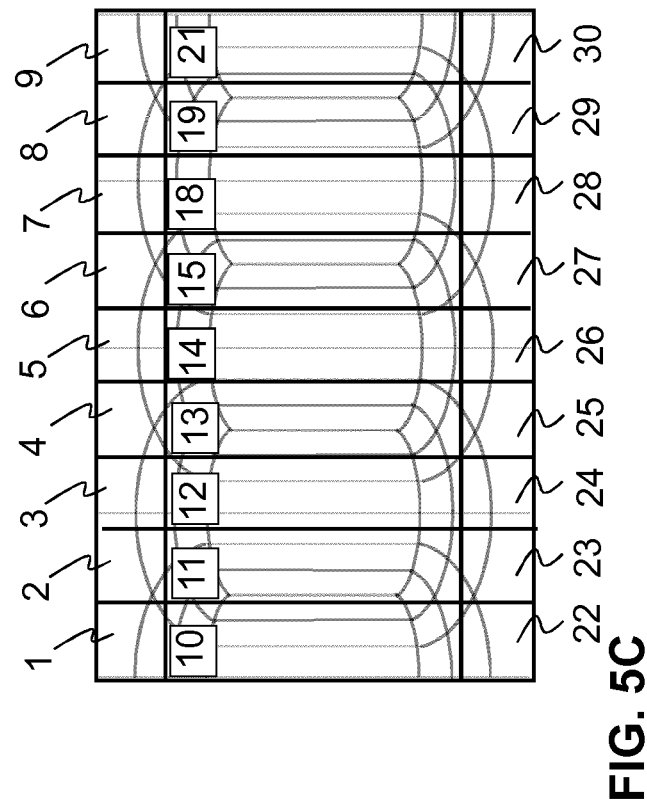

FIG. 5A-5D illustrate different tiling arrangements that can be requested with a client device. Such tiling arrangement may be referred to as a tiling representations of an omnidirectional video. Different tiling representations may be related to different video quality. The tiling representation may include a non-tiled low-resolution video representation as depicted in FIG. 5A and tiled high-resolution representation as depicted in FIG. 5B. The high-resolution representation may be used for displaying content for the central part of the FOV. To serve the omnidirectional content to the user, the client may request the non-tiled lowest resolution layer to cover the entire panorama view and tiles 9 and 10 of the highest resolution layer (representing the centre of the FOV). Additionally, the client device may select four tiles of the medium resolution layers for the peripheral FOV, namely tiles 5 and 14 of the horizontally tiled medium resolution layer as shown in FIG. 5D and tiles 12 and 16 of the vertically tiled medium resolution layer as shown in FIG. 5C.

Figure 6:
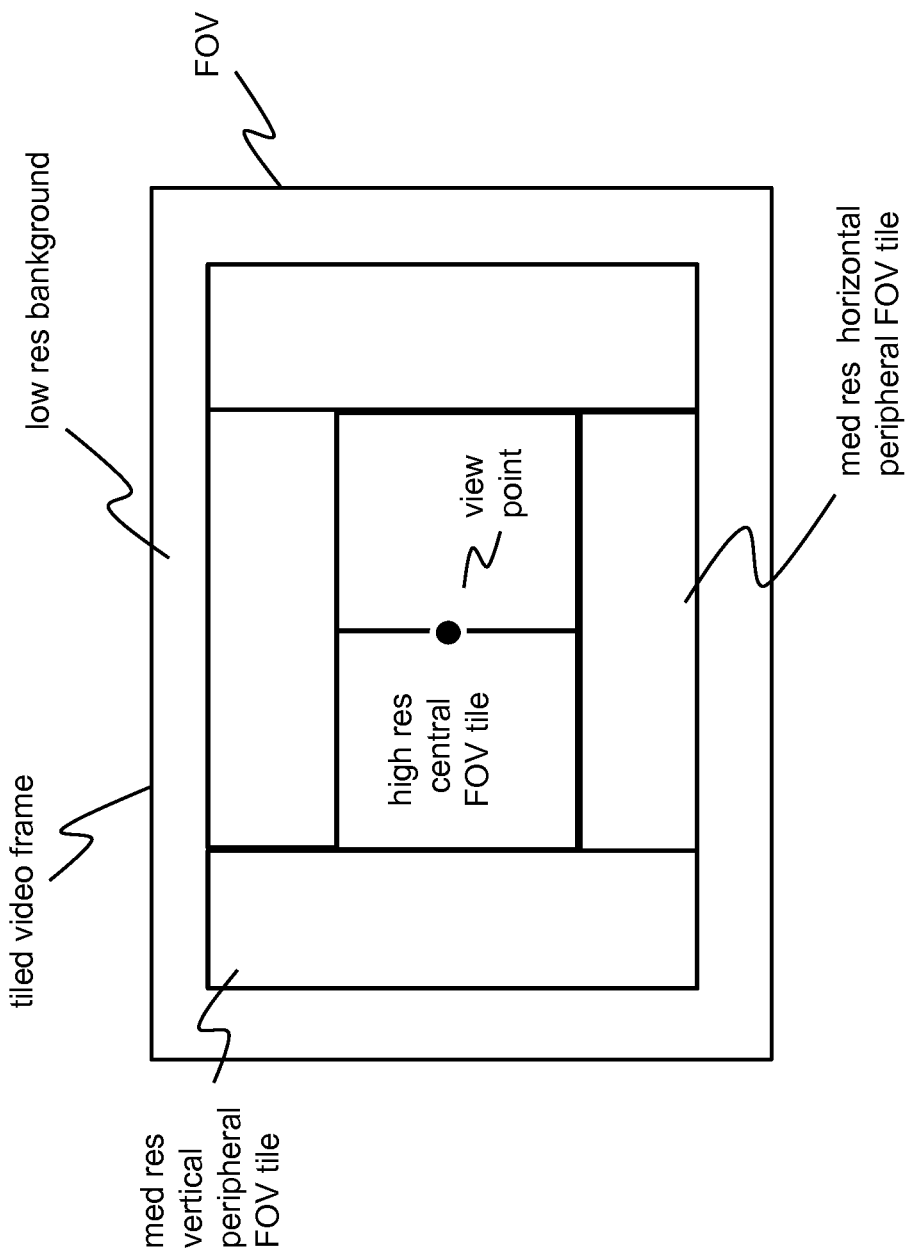
FIG. 6 depicts a video frame comprising tiled video omnidirectional video according to an embodiment of the invention.

The resulting FOV is shown in FIG. 6 which depicts a video frame comprising tiled video omnidirectional video according to an embodiment of the invention.

As shown in FIG. 6, the central part of the FOV is delivered at a very high quality, and the quality diminishes towards the edges of the FOV. To minimize the perceived effect of the tiles abruptly changing resolution at the borders, overlapping tiles may be used. In that case, the high-resolution tiles at the centre of the FOV overlap with the medium resolution tiles into the periphery. The client device may use a filter wherein the high resolution tiles may be gradually scaled at the borders to merge with the medium resolution tiles and wherein, when applicable, the medium resolution tiles may be gradually scaled at the borders to merge with the low-resolution background.

In a further embodiment, the non-tiled and tiled video representations may be coded on the basis of an scalable video coded (SVC) as known from the Annex G extension of the H.264/MPEG-4 AVC video compression standard. Hence, in that case, the non-tiled low-resolution layer may be formatted as a SVC base layer, while the tiled medium and high resolution representations may be formatted as SVC enhancement layers.

An DASH MPD that may be used by a client device to select and request the tiles illustrated in FIG. 6 is provided in table 1:

TABLE 1 an example of an MPD supporting an SRD extension for tiled omnidirectional video

```
<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"
 profiles="urn:mpeg:dash:profile:isoff-on-demand:2011">
 <ProgramInformation>
   <Title>Example of a DASH Media Presentation Description using Spatial Relationships
Description to signal tiled VR content</Title>
 </ProgramInformation>
 <Period>
   <!-- Low Resolution video -->
   <AdaptationSet segmentAlignment="true" subsegmentAlignment="true"
subsegmentStartsWithSAP="1">
     <Role schemeIdUri="urn:mpeg:dash:role:2011" value="main"/>
     <SupplementalProperty schemeIdUri="urn:mpeg:dash:srd:vr:2016"
value="0,0,180,0,360,180,360,180,0"/>
     <Representation mimeType="video/mp4" codecs="avc1.42c01e" width="733" height="367"
bandwidth="269011" startWithSAP="1">
       <BaseURL> full_video_lowres.mp4</BaseURL>
       <SegmentBase indexRangeExact="true" indexRange="837-988"/>
     </Representation>
   </AdaptationSet>
   <!-- Mid-res layer with vertical tiles -->
   ...
   <!-- Tile 12 -->
   <AdaptationSet segmentAlignment="true" subsegmentAlignment="true"
subsegmentStartsWithSAP="1">
     <Role schemeIdUri="urn:mpeg:dash:role:2011" value="supplementary"/>
     <EssentialProperty schemeIdUri="urn:mpeg:dash:srd:vr:2016" value="0,0,
100,0,40,120,360,180,1"/>
```

TABLE 1-continued an example of an MPD supporting an SRD extension for tiled omnidirectional video

```xml
    <Representation mimeType="video/mp4" codecs="avc1.42c00d" width="163" height="489" bandwidth="79707" startWithSAP="1">
      <BaseURL> tile12_video_midres.mp4</BaseURL>
      <SegmentBase indexRangeExact="true" indexRange="837-988"/>
    </Representation>
  </AdaptationSet>
...
  <!-- Tile 16 -->
  <AdaptationSet segmentAlignment="true" subsegmentAlignment="true" subsegmentStartsWithSAP="1">
    <EssentialProperty schemeIdUri="urn:mpeg:dash:srd:vr:2016" value="0,0,260,0,40,120,360,180,1"/>
    <Representation mimeType="video/mp4" codecs="avc1.42c00d" width="163" height="489" bandwidth="79707" startWithSAP="1">
      <BaseURL> tile16_video_midres.mp4</BaseURL>
      <SegmentBase indexRangeExact="true" indexRange="837-988"/>
    </Representation>
  </AdaptationSet>
...
  <!-- Mid-res layer with horizontal tiles -->
...
  <!-- Tile 5 -->
  <AdaptationSet segmentAlignment="true" subsegmentAlignment="true" subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,0,180,45,120,30,360,180,2"/>
    <Representation mimeType="video/mp4" codecs="avc1.42c00d" width="489" height="122" bandwidth="79707" startWithSAP="1">
      <BaseURL> tile5_video_midres.mp4</BaseURL>
      <SegmentBase indexRangeExact="true" indexRange="837-988"/>
    </Representation>
  </AdaptationSet>
...
  <!-- Tile 14 -->
  <AdaptationSet segmentAlignment="true" subsegmentAlignment="true" subsegmentStartsWithSAP="1">
    <EssentialProperty schemeIdUri="urn:mpeg:dash:srd:vr:2016" value="0,0,180,-45,120,30,360,180,2"/>
    <Representation mimeType="video/mp4" codecs="avc1.42c00d" width="489" height="122" bandwidth="79707" startWithSAP="1">
      <BaseURL> tile14_video_midres.mp4</BaseURL>
      <SegmentBase indexRangeExact="true" indexRange="837-988"/>
    </Representation>
  </AdaptationSet>
...
<!-- High-res layer -->
...
  <!-- Tile 9 -->
  <AdaptationSet segmentAlignment="true" subsegmentAlignment="true" subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,0,150,0,60,60,360,180,3"/>
    <Representation mimeType="video/mp4" codecs="avc1.42c00d" width="367" height="367" bandwidth="134689" startWithSAP="1">
      <BaseURL> tile12_video_highres.mp4</BaseURL>
      <SegmentBase indexRangeExact="true" indexRange="837-988"/>
    </Representation>
  </AdaptationSet>
  <!-- Tile 10 -->
  <AdaptationSet segmentAlignment="true" subsegmentAlignment="true" subsegmentStartsWithSAP="1">
    <EssentialProperty schemeIdUri="urn:mpeg:dash:srd:vr:2016" value="0,0,210,0,60,60,360,180,3"/>
    <Representation mimeType="video/mp4" codecs="avc1.42c00d" width="367" height="367" bandwidth="134689" startWithSAP="1">
      <BaseURL> tile10_video_highres.mp4</BaseURL>
      <SegmentBase indexRangeExact="true" indexRange="837-988"/>
    </Representation>
  </AdaptationSet>
...
 </Period>
</MPD>
```

The above MPD, comprises an new schemeIdUri "urn:mpeg:dash:srd:vr:2016" for signalling a client device that the network supports an extended SRD that is suitable for describing spatially tiled omnidirectional video. Further, the MPD comprises an additional SRD parameter "space" at the second place of the value field of the EssentialProperty and SupplementalProperty (after the source_id parameter). This parameter, which is part of the mapping information, may signal the client device about the type of 2D projection that is used for the omnidirectional video data that is identified in the manifest file. For example, the space parameter may have the value "0" for signaling the client device that the omnidirectional video is represented by an equirectangular 2D projection. Since the equirectangular 2D projection does not require additional parameters to characterize it, the subsequent SRD parameters in the value field are object_x, object_y, object_width, object_height, total_width, total_height, spatial_set_id (which are the standard SRD parameters which may be reused on the basis of a new functional description as described above).

Figure 7:
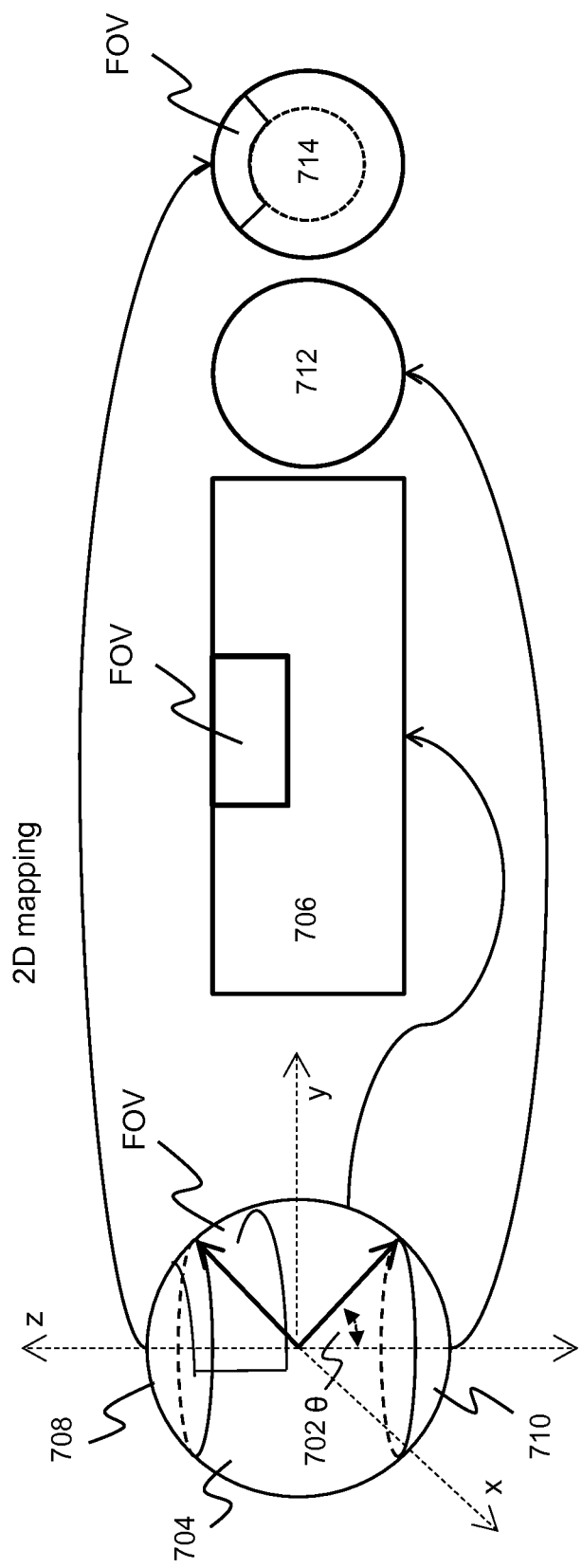
FIG. 7 illustrates another example of a projection of an omnidirectional video onto a 2D plane.

An example for a cylindrical 2D projection is described with reference to FIG. 7-11 below. FIG. 7 illustrates the cylindrical representation space, wherein part of the sphere 704 included between the pitch angles 702 $-\theta$ and $+\theta$ angles is represented by an equirectangular projection 706, while the north pole 708 and the south pole 710 are represented as circular projections 712,714.

Figure 8:
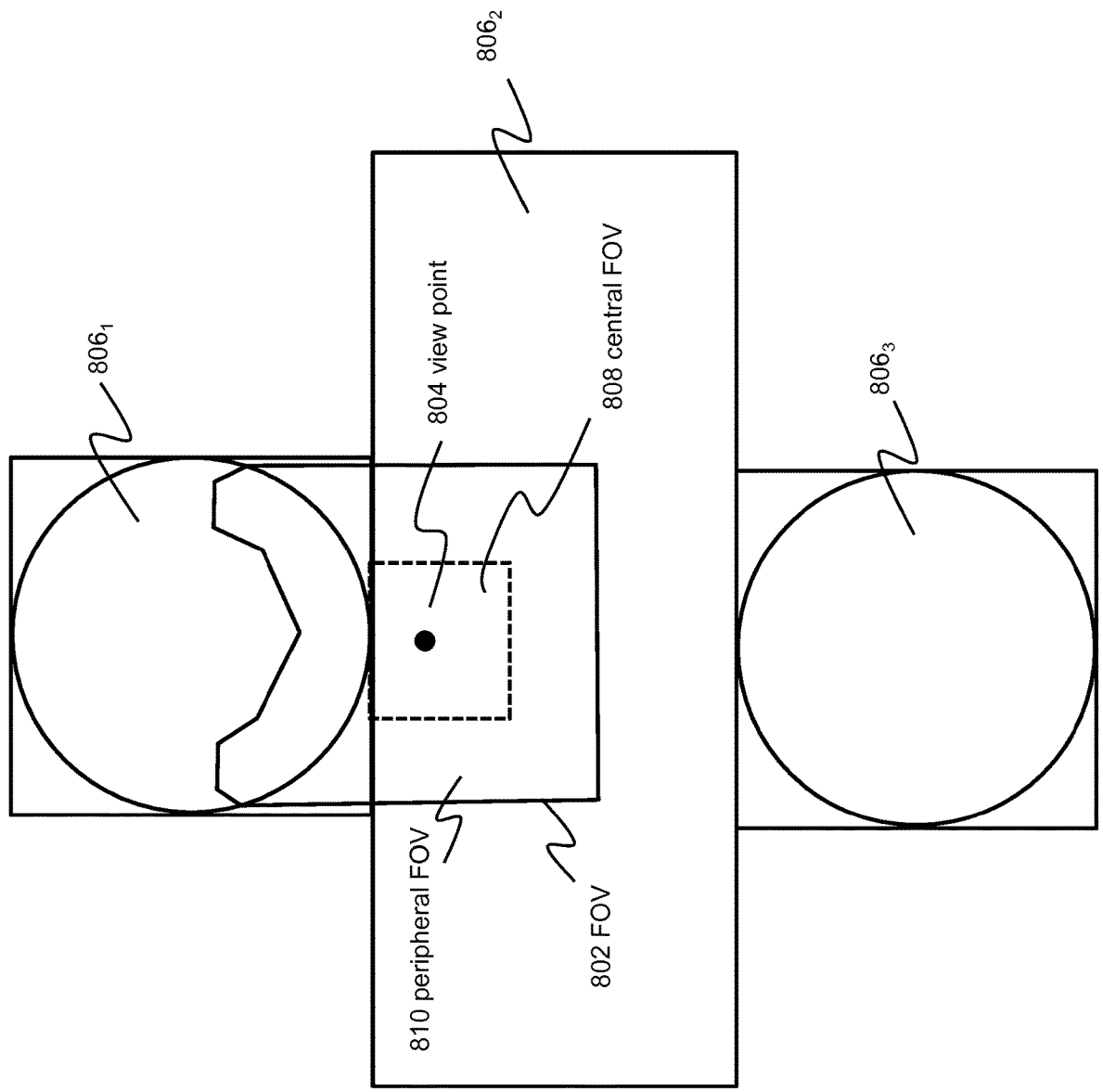
FIG. 8 illustrates a field of view of a client device for omnidirectional video according to an embodiment of the invention.

FIG. 8 illustrates a field of view of a client device for tiled omnidirectional video according to another embodiment of the invention. In particular, FIG. 8 depicts a viewpoint and a FOV of a user looking in the direction of a curved surface which is used displaying omnidirectional content that is based on a cylindrical mapping. Here, the FOV 802 defines the part of the content that is shown to the view and $806_{1-3}$ define the parts of the content that are not shown to the view. The FOV is further divided in a central FOV 808 and a peripheral FOV 810. In the central part of the FOV high quality content may be displayed while in the periphery a lower quality, e.g. standard quality, may be selected.

An example of a cylindrical 2D projection is provided in FIGS. 9A-9D and FIG. 10 below. In the cylindrical 2D projection, the omnidirectional content is represented in the bitstream as a combination of an equirectangular projection and circular projections.

The different tiling representations in FIGS. 9A-9D may be related to different video qualities. The tiling representation may include a non-tiled low-resolution video representation as depicted in FIG. 9A and a tiled high-resolution representation as depicted in FIG. 9B.

The high-resolution representation may be used for displaying content for the central part of the FOV. To serve the omnidirectional content to the user, the client device may request the single tile of the lowest resolution layer to cover the entire panorama view and tile 3 of the highest resolution layer for the central part of the FOV. Further, a number of medium resolution type tiles may be used for the peripheral FOV. For example, tiles 5 and 13 of the horizontally tiled medium resolution layer (FIG. 9C) and tiles 4, 7 and 17 of the vertically tiled medium resolution layer (FIG. 9D).

Figure 10:
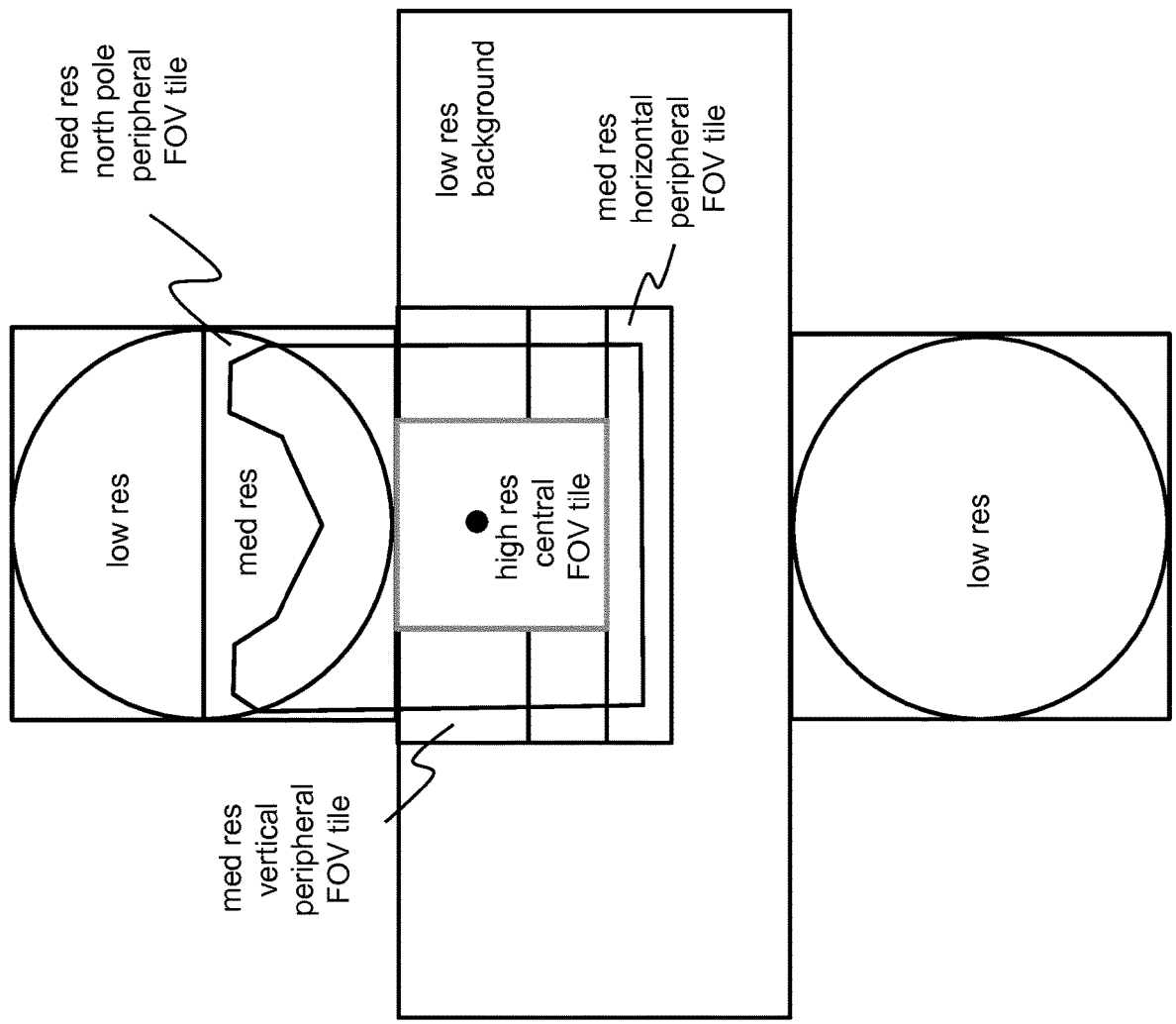
FIG. 10 depicts a video frame comprising tiled video omnidirectional video according to an embodiment of the invention.

The resulting FOV is shown in FIG. 10 which depicts a video frame comprising tiled omnidirectional video according to an embodiment of the invention. Similar to the equirectangular as described with reference to FIG. 6, the central part of the FOV is realized on the basis of high quality content and the quality decreases in the direction of the boundaries of the FOV. Also in this case, smoothing at the borders between higher resolution tiles and lower resolution tiles may be performed to minimize the perceived effect of the tiles abruptly changing resolution at the borders.

A DASH MPD that may be used by a client device to select and request the tiles illustrated in FIG. 10 is provided in table 2:

TABLE 2 an example of an MPD supporting an SRD extension for tiled omnidirectional video

```
<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"
 profiles="urn:mpeg:dash:profile:isoff-on-demand:2011">
 <ProgramInformation>
   <Title>Example of a DASH Media Presentation Description using Spatial Relationships
Description to signal tiled VR content</Title>
 </ProgramInformation>
 <Period>
   <!-- Low Resolution video -->
   <!-- Tile 1, rectangle -->
   <AdaptationSet segmentAlignment="true" subsegmentAlignment="true"
subsegmentStartsWithSAP="1">
     <Role schemeIdUri="urn:mpeg:dash:role:2011" value="main"/>
     <SupplementalProperty schemeIdUri="urn:mpeg:dash:srd:vr:2016"
value="0,1,90,180,0,360,90,360,180,0"/>
     <Representation mimeType="video/mp4" codecs="avc1.42c01e" width="740" height="324"
bandwidth="239760" startWithSAP="1">
       <BaseURL> full_video_lowres1.mp4</BaseURL>
       <SegmentBase indexRangeExact="true" indexRange="837-988"/>
     </Representation>
   </AdaptationSet>
   <!-- Tile 2, south pole -->
   <AdaptationSet segmentAlignment="true" subsegmentAlignment="true"
subsegmentStartsWithSAP="1">
     <Role schemeIdUri="urn:mpeg:dash:role:2011" value="main"/>
     <SupplementalProperty schemeIdUri="urn:mpeg:dash:srd:vr:2016" value="0,1,90,180,
−67.5,360,45,360,180,0"/>
```

TABLE 2-continued an example of an MPD supporting an SRD extension for tiled omnidirectional video

```
    <Representation mimeType="video/mp4" codecs="avc1.42c01e" width="324" height="324"
bandwidth="74976" startWithSAP="1">
      <BaseURL> full_video_lowres2.mp4</BaseURL>
      <SegmentBase indexRangeExact="true" indexRange="837-988"/>
    </Representation>
  </AdaptationSet>
  <!-- Tile 3, north pole -->
  <AdaptationSet segmentAlignment="true" subsegmentAlignment="true"
subsegmentStartsWithSAP="1">
    <Role schemeIdUri="urn:mpeg:dash:role:2011" value="main"/>
    <SupplementalProperty schemeIdUri="urn:mpeg:dash:srd:vr:2016"
value="0,1,180,67.5,360,45,360,180,0"/>
    <Representation mimeType="video/mp4" codecs="avc1.42c01e" width="324" height="324"
bandwidth="74976" startWithSAP="1">
      <BaseURL> full_video_lowres3.mp4</BaseURL>
      <SegmentBase indexRangeExact="true" indexRange="837-988"/>
    </Representation>
  </AdaptationSet>
  <!-- Mid-res layer with vertical tiles -->
...
  <!-- Tile 4 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,1,90,
126,22.5,36,45,360,180,1"/>
    <Representation mimeType="video/mp4" codecs="avc1.42c00d" width="148" height="324"
bandwidth="47952" startWithSAP="1">
      <BaseURL> tile4_video_midres.mp4</BaseURL>
      <SegmentBase indexRangeExact="true" indexRange="837-988"/>
    </Representation>
  </AdaptationSet>
...
  <!-- Tile 7 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,1,90,
206,22.5,36,45,360,180,1"/>
    <Representation mimeType="video/mp4" codecs="avc1.42c00d" width="148" height="324"
bandwidth="47952" startWithSAP="1">
      <BaseURL> tile7_video_midres.mp4</BaseURL>
      <SegmentBase indexRangeExact="true" indexRange="837-988"/>
    </Representation>
  </AdaptationSet>
...
  <!-- Tile 17 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,1,90,
234,-22.5,36,45,360,180,1"/>
    <Representation mimeType="video/mp4" codecs="avc1.42c00d" width="148" height="324"
bandwidth="47952" startWithSAP="1">
      <BaseURL> tile17_video_midres.mp4</BaseURL>
      <SegmentBase indexRangeExact="true" indexRange="837-988"/>
    </Representation>
  </AdaptationSet>
...
  <!-- Mid-res layer with horizontal tiles -->
...
  <!-- Tile 5 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016" value="0,1,90,
180,0,120,30,360,180,2"/>
    <Representation mimeType="video/mp4" codecs="avc1.42c00d" width="493" height="216"
bandwidth="106488" startWithSAP="1">
      <BaseURL> tile5_video_midres.mp4</BaseURL>
      <SegmentBase indexRangeExact="true" indexRange="837-988"/>
    </Representation>
  </AdaptationSet>
...
  <!-- Tile 13, half of the north pole -->
  <AdaptationSet segmentAlignment="true" subsegmentAlignment="true"
subsegmentStartsWithSAP="1">
```

TABLE 2-continued an example of an MPD supporting an SRD extension for tiled omnidirectional video

```
    <EssentialProperty schemeIdUri="urn:mpeg:dash:srd:vr:2016"
value="0,1,90,180,67.5,180,45,360,180,2"/>
    <Representation mimeType="video/mp4" codecs="avc1.42c00d" width="648" height="324"
bandwidth="139968 " startWithSAP="1">
      <BaseURL> tile13_video_midres.mp4</BaseURL>
      <SegmentBase indexRangeExact="true" indexRange="837-988"/>
    </Representation>
  </AdaptationSet>
...
<!-- High-res layer -->
...
  <!-- Tile 3 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
    <EssentialProperty schemeIdUri="urn:mpeg:dash:srd:vr:2016"
value="0,1,90,180,22.5,72,45,360,180,3"/>
    <Representation mimeType="video/mp4" codecs="avc1.42c00d" width="538" height="648"
bandwidth="348624" startWithSAP="1">
      <BaseURL> tile3_video_highres.mp4</BaseURL>
      <SegmentBase indexRangeExact="true" indexRange="837-988"/>
    </Representation>
  </AdaptationSet>
 </Period>
</MPD>
```

In this MPD, two additional SRD parameters at the second place of the value field of the EssentialProperty and SupplementalProperty (after the source_id parameter) are provided. The first parameter is the "space" parameter for signaling the 2D projection to the client device. A second parameter is associated with the specific 2D projection, in this particular example, the cylindrical 2D projection, characterizing the height of cylinder.

For example, the space parameter may have the value "1" for signaling the client device that the omnidirectional video is based on a cylindrical 2D projection. The subsequent parameters in the value field may be object_x, object_y, object_width, object_height, total_width, total_height, spatial_set_id (which are the standard SRD parameters which may be reused on the basis of a new functional description as described above).

The height of the cylinder does not need to be signalled: from the way in which the poles and the rectangular part of the cylinder are indicated in the MPD, it is possible to deduce their form and size without the need of the additional height parameter. However, in another embodiment the height of the cylinder may be signaled, in order to make it explicit to the client device.

In the example above, the SRD parameters are reported in the value field of the SupplementalProperty or EssentialProperty. However, in other embodiments these parameters may be listed as separate fields within the SupplementalProperty or EssentialProperty or even sub-elements of it.

In a further embodiment, instead of rectangular tiles other shapes, e.g. spherical tiles, may be used. Spherical tiles only require one parameter to indicate the size of the tile, namely its radius.

For virtual reality, reduction of latency is very important. Hence, in some embodiments, it may be desirable to reduce the data processing on the side of the client device, in particular the process wherein the client device has to select the tiles that match the FOV.

Therefore, an alternative approach is that of having the client only send the details of the user's viewpoint and FOV (pitch and yaw of the viewpoint and size of the FOV) to the server, using a suitable protocol, e.g. the Quick UDP Internet Connections (QUIC) protocol, to save latency even further. The server may use a tiling scheme, e.g. an HEVC tiling scheme, in order to divide the omnidirectional content in tile streams. Then, upon the client's request, the server may send the most appropriate tiles to the client device.

Figure 11:
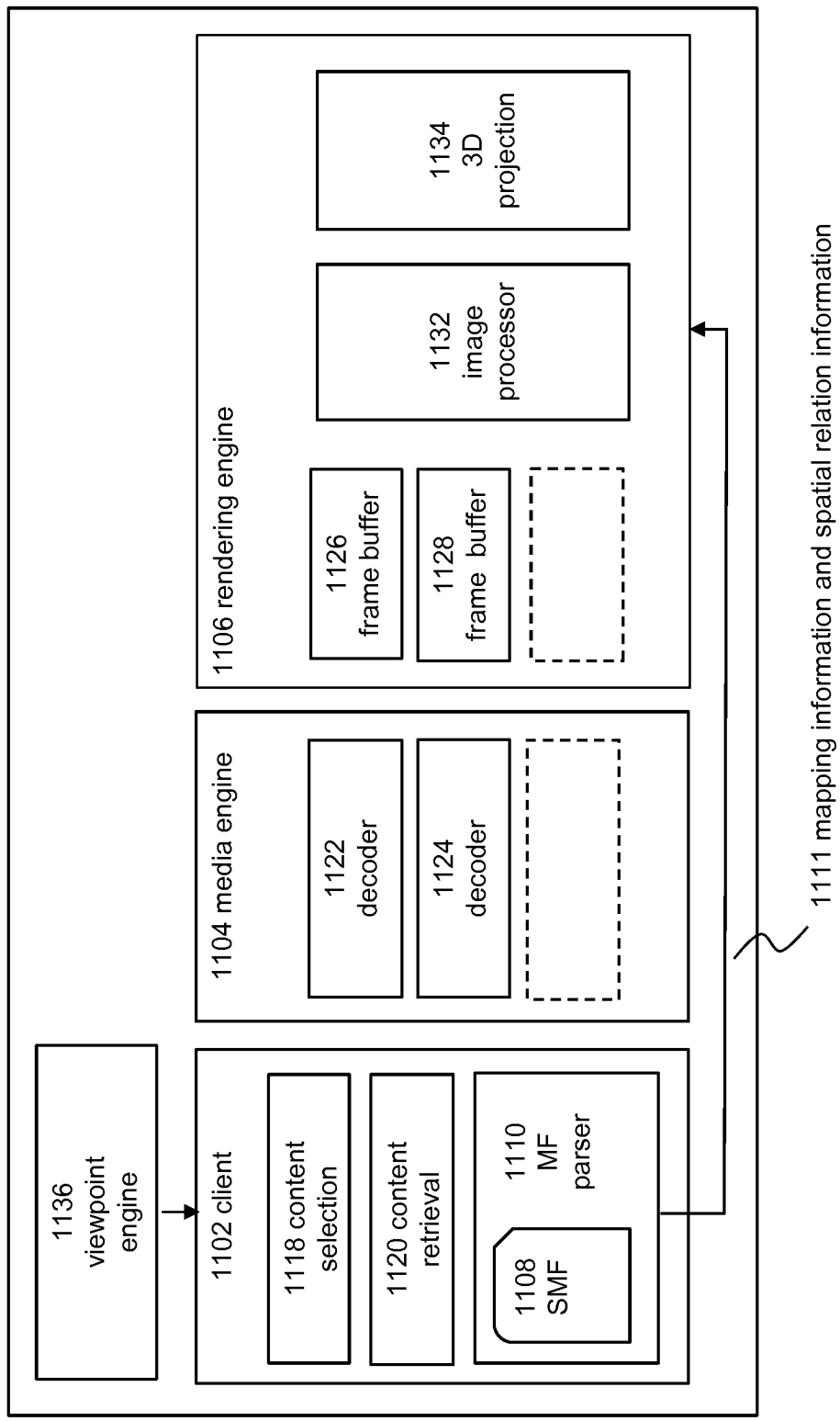
FIG. 11 depicts a client device adapted for processing a spatially tiled omnidirectional video according to an embodiment of the invention.

FIG. 11 depicts an video processing device adapted for processing a spatially tiled omnidirectional video according to an embodiment of the invention. In particular, FIG. 11 depicts a video processing device 1100 comprising a client device 1102 for selecting and retrieving content, including tiled and non-tiled omnidirectional video data, a media engine 1104 comprising one or more decoders 1122, 1124 for decoding, media of the base and enhancement tile streams and a rendering engine 1106 comprising one or more video frame buffers for buffering video frames originating from the rendering engine, an image processor 1132 for spatially arranging the video frames of the tiles and to stitch the video frames into one video frame and a 3D projection module that is configured to project the video data of the video frame onto a curved (e.g. spherical) surface that is used for displaying the content to a user. The 3D projection module may be configured to project the video data of the video frame onto a curved (e.g. spherical) surface on the basis of mapping information.

As shown in FIG. 11 the client device may be configured to receive one or more manifest files 1108 and store the manifest file in a memory. A manifest file parser 1110 may parse and analyse the manifest file and provide information on the tiled omnidirectional video, i.e. the tile streams, to a content selection module 1118. The content selection module may be adapted to receive information on the viewpoint of the user of the video processing device. The viewpoint may be continuously updated by a viewpoint engine 1136 and provided to the client device.

The content selection module may use the information on the viewpoint, i.e. the coordinates of the viewpoint, and the spatial relation information (as e.g. specified on the basis of spatial relation descriptors (SRDs) in the manifest file to select one or more tile streams.

The content selection module may forward the information on the selected tile streams, in particular URLs on the selected tile streams, to a content retrieval module that may be configured to transmit request messages to one or more network nodes and to receive response messages comprising parts of the requested tile streams. In an embodiment, the client device may comprise an HTTP client for transmitting HTTP request messages to an HTTP media server and for receiving HTTP response messages comprising media data of the requested media stream.

The content retrieval module may further comprise one or more buffers for receiving the requested media data and to prepare the media data for input to the media engine 1104.

Figure 12:
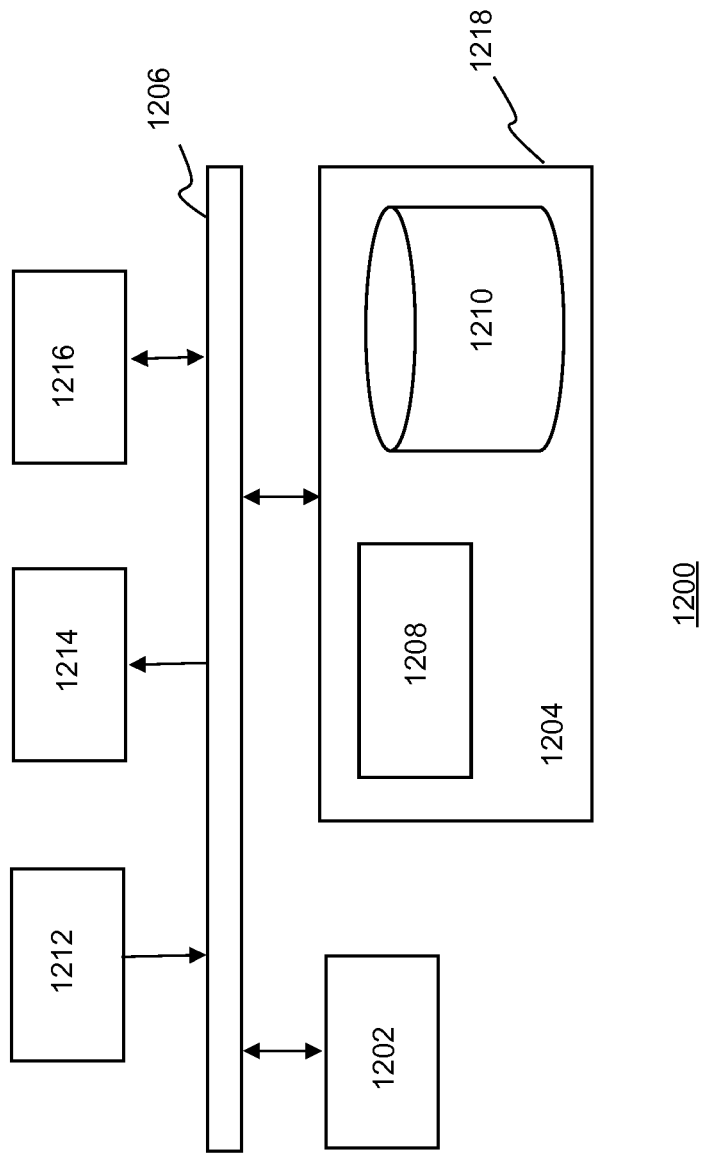
FIG. 12 depicts a block diagram illustrating an exemplary data processing system that may be used with embodiments described in this disclosure.

FIG. 12 is a block diagram illustrating an exemplary data processing system that may be used as described in this disclosure. Data processing system 1200 may include at least one processor 1202 coupled to memory elements 1204 through a system bus 1206. As such, the data processing system may store program code within memory elements 1204. Further, processor 1202 may execute the program code accessed from memory elements 1204 via system bus 1206. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1204 may include one or more physical memory devices such as, for example, local memory 1208 and one or more bulk storage devices 1210. Local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from bulk storage device 1210 during execution.

Input/output (I/O) devices depicted as input device 1212 and output device 1214 optionally can be coupled to the data processing system. Examples of input device may include, but are not limited to, for example, a positional tracker, a keyboard, a pointing device such as a mouse, a touch screen or the like. Examples of output device may include, but are not limited to, for example, a monitor or (head-mounted) display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1250.

As pictured in FIG. 12, memory elements 1204 may store an application 1218. It should be appreciated that data processing system 1200 may further execute an operating system (not shown) that can facilitate execution of the application. Application, being implemented in the form of executable program code, can be executed by data processing system 1200, e.g., by processor 1202. Responsive to executing application, data processing system may be configured to perform one or more operations to be described herein in further detail.

In one aspect, for example, data processing system 1200 may represent a client data processing system. In that case, application 1218 may represent a client application that, when executed, configures data processing system 1300 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1218, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of processing an omnidirectional video by a client device, said omnidirectional video being associated with a 3D coordinate system for determining a spatial position of video data of said omnidirectional video on a curved surface, said method comprising:
    receiving a manifest file, the manifest file comprising a plurality of tile stream identifiers for identifying a plurality of tile streams, the tile streams comprising video frames with 2D projected video data, the video frames having image views, whereby the image views of video frames of different tile streams cover different regions of a 2D projection of the omnidirectional video, a region defining a tile;
    selecting on the basis of spatial relation information in the manifest file and on the basis of a viewpoint of a user of the client device a first tile stream associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, the tile position and the viewpoint being defined on the basis of coordinates of the 3D coordinate system;

requesting the selected tile streams from one or more tile stream storage devices; and, receiving the 2D projected video data of the selected tile streams and receiving mapping information, the mapping information providing the client device with information for enabling the client device to map the 2D projected video data of the tile streams as omnidirectional video data onto the curved surface;

processing the 2D projected video data of said received tile streams on the basis of the spatial relation information and the mapping information.

2. Method according to claim 1, wherein at least part of the mapping information is comprised in said manifest file.

3. Method according to claim 1 wherein the mapping information comprises an indication of the type of 2D projection that is used for projecting the omnidirectional video data onto a planar surface.

4. Method according to claim 3, wherein the mapping information further comprises one or more parameters that are needed for mapping the 2D projected video data onto the curved surface.

5. Method according to claim 1 wherein the viewpoint is associated with a field of view of the user, the selecting including:

selecting a tile stream of a high resolution for a tile position located in at least part of a central part of the field of view; and, selecting a tile stream of a lower resolution than the high resolution for a tile position located in at least part of a peripheral part of the field of view.

6. Method according to claim 1 wherein said processing the 2D projected video data further comprises:

decoding the 2D projected video data of said received tile streams into video frames representing tiles;

spatially arranging the video frames of the tiles associated with one time instance and stitching the video frames into one video frame; and, mapping the 2D projected video data of the video frame as omnidirectional video data on the curved surface on the basis of the mapping information.

7. Method according to claim 1 wherein the requesting and receiving of said selected one or more tile streams is based on an HTTP adaptive streaming protocol.

8. Method according to claim 1 wherein the manifest file further defines one or more representations of a tile stream.

9. Method according to claim 1 wherein the manifest file comprises one or more spatial relation descriptors (SRD), a spatial relation descriptor comprising one or more SRD parameters for defining the tile position and dimensions of the tile on the basis of coordinates of the 3D coordinate system.

10. Method according to claim 9 wherein the one or more spatial relation descriptors (SRD) further comprise one or more SRD parameters for signaling a type of 2D projection that is used for projecting the omnidirectional video data onto a planar surface.

11. Non-transitory computer-readable storage media comprising a computer program product comprising software code portions configured for, when run in the memory of a computer, executing the method steps according to claim 1.

12. A client device for processing an omnidirectional video, said omnidirectional video being associated with a 3D coordinate system for determining a spatial position of video data of said omnidirectional video on a curved surface, the client device comprising:

a computer readable storage medium having computer readable program code embodied therewith, and a processor coupled to the computer readable storage medium, wherein responsive to executing the computer readable program code, the processor is configured to perform executable operations comprising:

receiving a manifest file, the manifest file comprising a plurality of tile stream identifiers for identifying a plurality of tile streams, the tile streams comprising video frames with 2D projected video data, the video frames having image views, whereby the image views of video frames of different tile streams cover different regions of a 2D projection of the omnidirectional video, a region defining a tile; and, selecting on the basis of spatial relation information in the manifest file and on the basis of a viewpoint of a user of the client device a first tile stream associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, the tile position and the viewpoint being defined on the basis of coordinates of the 3D coordinate system;

requesting the selected tile streams from one or more tile stream storage devices; and, receiving the 2D projected video data of the selected tile streams and receiving mapping information, the mapping information providing the client device with information for enabling the client device to map the 2D projected video data of the tile streams as omnidirectional video data onto the curved surface;

processing the 2D projected video data of said received tile streams on the basis of the spatial relation information and the mapping information.

13. Client device according to claim 12, wherein the manifest file comprises at least part of the mapping information.

14. Client device according to claim 12, wherein the manifest file comprises one or more spatial relation descriptors (SRD), a spatial relation descriptor comprising one or more SRD parameters for defining the tile position and dimensions of the tile on the basis of coordinates of the 3D coordinate system.

15. Client device according to claim 14, wherein the one or more spatial relation descriptors further comprise one or more SRD parameters for signaling a type of 2D projection that is used for projecting the omnidirectional video data onto a planar surface.

16. Non-transitory computer-readable storage media for storing a manifest file for a client device, said client device being configured to process an omnidirectional video by on the basis of said manifest file, said omnidirectional video being associated with a 3D coordinate system for determining a spatial position of video data of said omnidirectional video on a curved surface, said manifest file comprising computer readable data, said data comprising:

a plurality of tile stream identifiers for identifying a plurality of tile streams, the tile streams comprising video frames with 2D projected video data, the video frames having image views, whereby the image views of video frames of different tile streams cover different regions of a 2D projection of the omnidirectional video, a region defining a tile;

spatial relation information, the spatial relation information defining for each tile a tile position, the tile position and the viewpoint being defined on the basis of coordinates of the 3D coordinate system; and, mapping information for providing the client device with information for enabling the client device to map the 2D projected video data of the tile streams identified in the manifest file as omnidirectional video data onto the curved surface.

17. Non-transitory computer-readable storage media according to claim 16, wherein the computer readable data further comprises:

one or more spatial relation descriptors (SRD), a spatial relation descriptor comprising one or more SRD parameters for defining the tile position and dimensions of the tile on the basis of coordinates of the 3D coordinate system; and/or, one or more SRD parameters for signaling a type of 2D projection that is used for projecting the omnidirectional video data onto a planar surface.

* * * * *